(12) United States Patent
Suteerawanit

(10) Patent No.: US 12,550,881 B1
(45) Date of Patent: Feb. 17, 2026

(54) MULTI-FUNCTIONAL RODENT STATION

(71) Applicant: Nick Suteerawanit, Laguna Woods, CA (US)

(72) Inventor: Nick Suteerawanit, Laguna Woods, CA (US)

( * ) Notice: Subject to any disclaimer, the term of this patent is extended or adjusted under 35 U.S.C. 154(b) by 0 days.

(21) Appl. No.: 18/914,930

(22) Filed: Oct. 14, 2024

(51) Int. Cl.
*A01M 25/00* (2006.01)

(52) U.S. Cl.
CPC .................................. *A01M 25/004* (2013.01)

(58) Field of Classification Search
CPC .. A01M 25/00; A01M 25/002; A01M 25/004; A01M 25/006
USPC ..................................................... 43/124, 131
See application file for complete search history.

(56) References Cited

U.S. PATENT DOCUMENTS

| | | | | |
|---|---|---|---|---|
| 5,806,237 A | * | 9/1998 | Nelson ................. | A01M 25/004 43/131 |
| 5,966,863 A | * | 10/1999 | Payton ................. | A01M 1/2011 43/131 |
| 6,389,738 B1 | * | 5/2002 | Denny ................. | A01M 1/2011 43/58 |
| 6,397,517 B1 | * | 6/2002 | Leyerle ................. | A01M 23/24 43/88 |
| 6,470,622 B1 | * | 10/2002 | Braun ....................... | B65F 1/14 43/132.1 |
| 7,980,023 B2 | * | 7/2011 | Nelson ................... | A01M 23/30 43/67 |
| 8,793,929 B1 | * | 8/2014 | Walsh ................... | A01M 25/004 43/131 |
| 11,051,506 B2 | * | 7/2021 | Vickery .............. | B65D 71/0096 |
| 2005/0132637 A1 | * | 6/2005 | Deakins ............... | A01M 25/004 43/131 |
| 2009/0307963 A1 | * | 12/2009 | Abbas .................. | A01M 25/004 43/131 |
| 2014/0220859 A1 | * | 8/2014 | McCutchan ........... | A01K 67/30 119/416 |
| 2018/0116202 A1 | * | 5/2018 | Burger ................. | A01M 25/004 |

(Continued)

FOREIGN PATENT DOCUMENTS

| | | | | |
|---|---|---|---|---|
| DE | 202017004354 U1 | * | 10/2017 | ............ A01M 23/24 |
| WO | WO-2014128438 A1 | * | 8/2014 | .......... A01M 25/004 |

OTHER PUBLICATIONS

English translation of DE 202017004354 U1 (Year: 2017).*

*Primary Examiner* — David J Parsley
*Assistant Examiner* — Danielle A Clerkley
(74) *Attorney, Agent, or Firm* — AGK Patent & Trademark Law; Philip Y Kim

(57) ABSTRACT

The invention relates to a rodent multifunctional station designed for effective rodent control. The station comprises a main body with rodent entry points and an internal structure to accommodate various traps or bait, including liquid poison or pellet bait. A removable top cover is secured with a tubular cam lock for tamper resistance. Inside, a liner collects debris and is equipped with handles for easy removal. The station includes a container with a liquid reservoir and outlets for poison dispensing, along with metal rods for suspending bait. The main body features drainage points to prevent liquid buildup and security holes for fastening to fixed objects. The entry points are designed to prevent insect access, and the station can be securely fastened to surfaces with integrated screw holes. This versatile system supports multiple baiting and trapping configurations for efficient rodent control.

25 Claims, 19 Drawing Sheets

(56) References Cited

U.S. PATENT DOCUMENTS

2021/0015090 A1\*   1/2021   Galloway ........... A01M 25/002
2024/0397929 A1\*  12/2024   Suteerawanit ...... A01M 23/005

\* cited by examiner

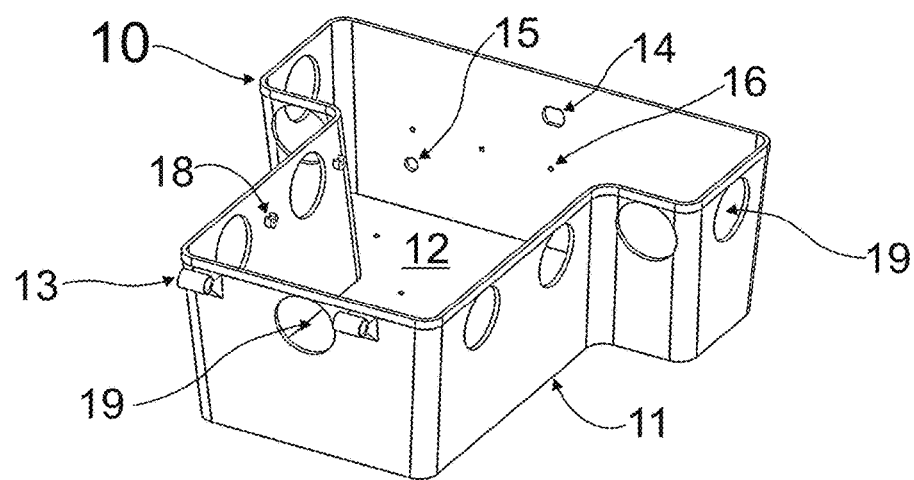
FIG. 4
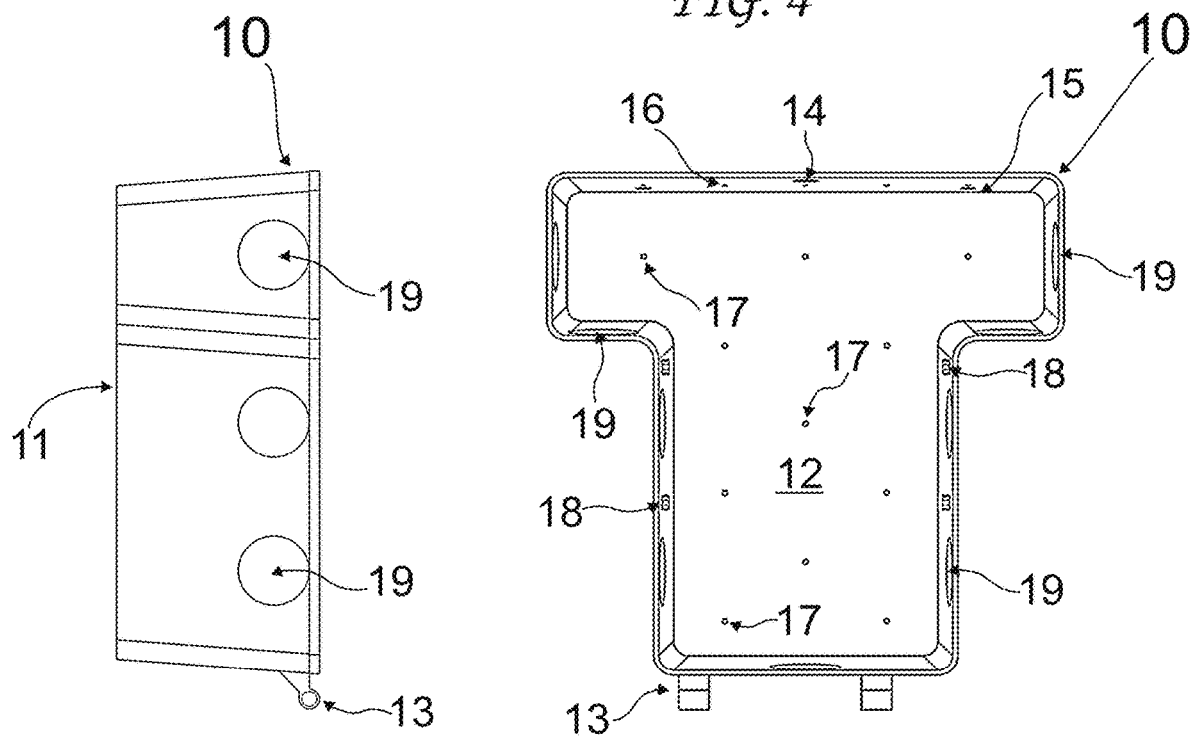
FIG. 4C
FIG. 4A
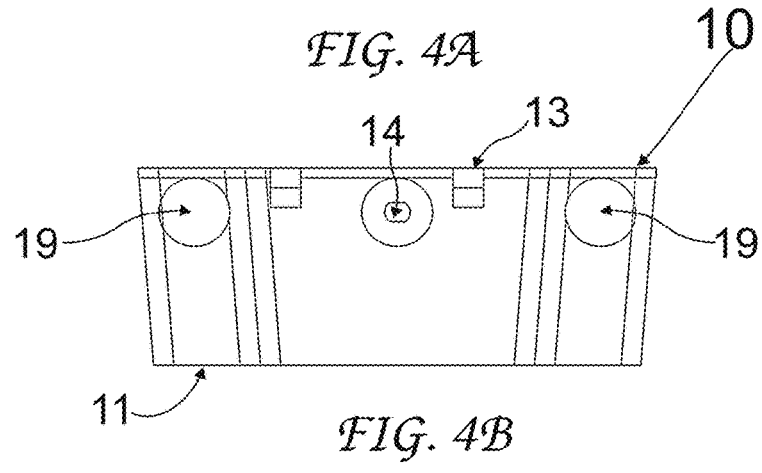
FIG. 4B

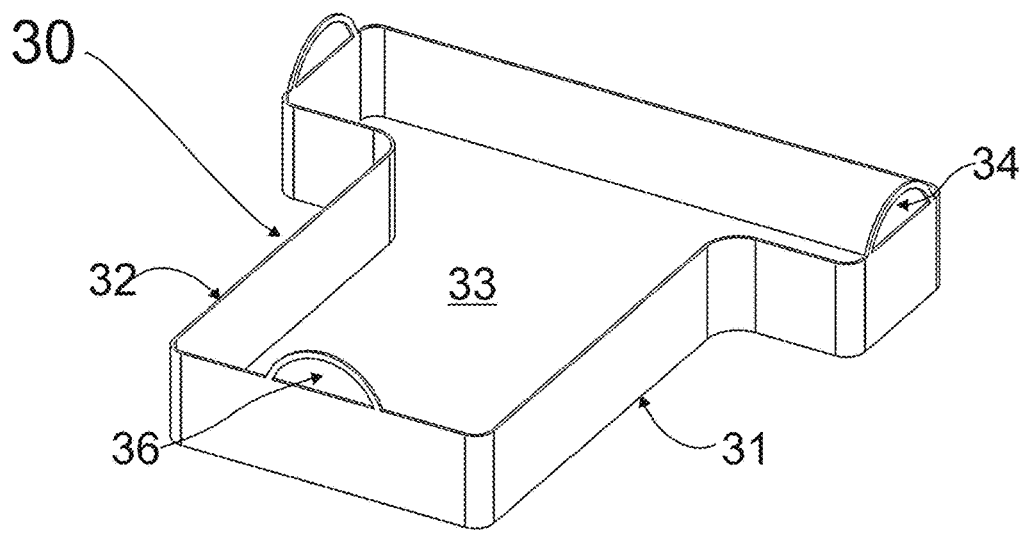
FIG. 6
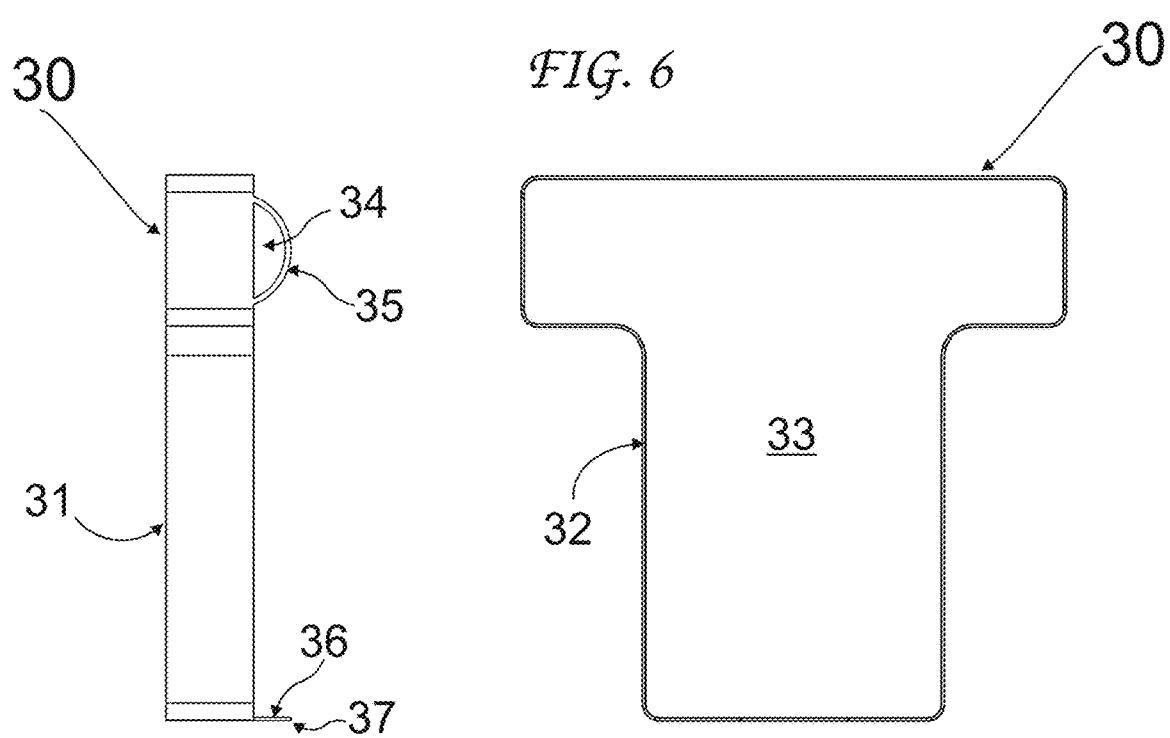
FIG. 6C
FIG. 6A
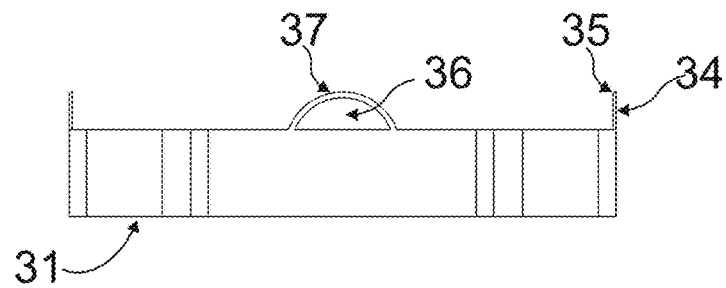
FIG. 6B

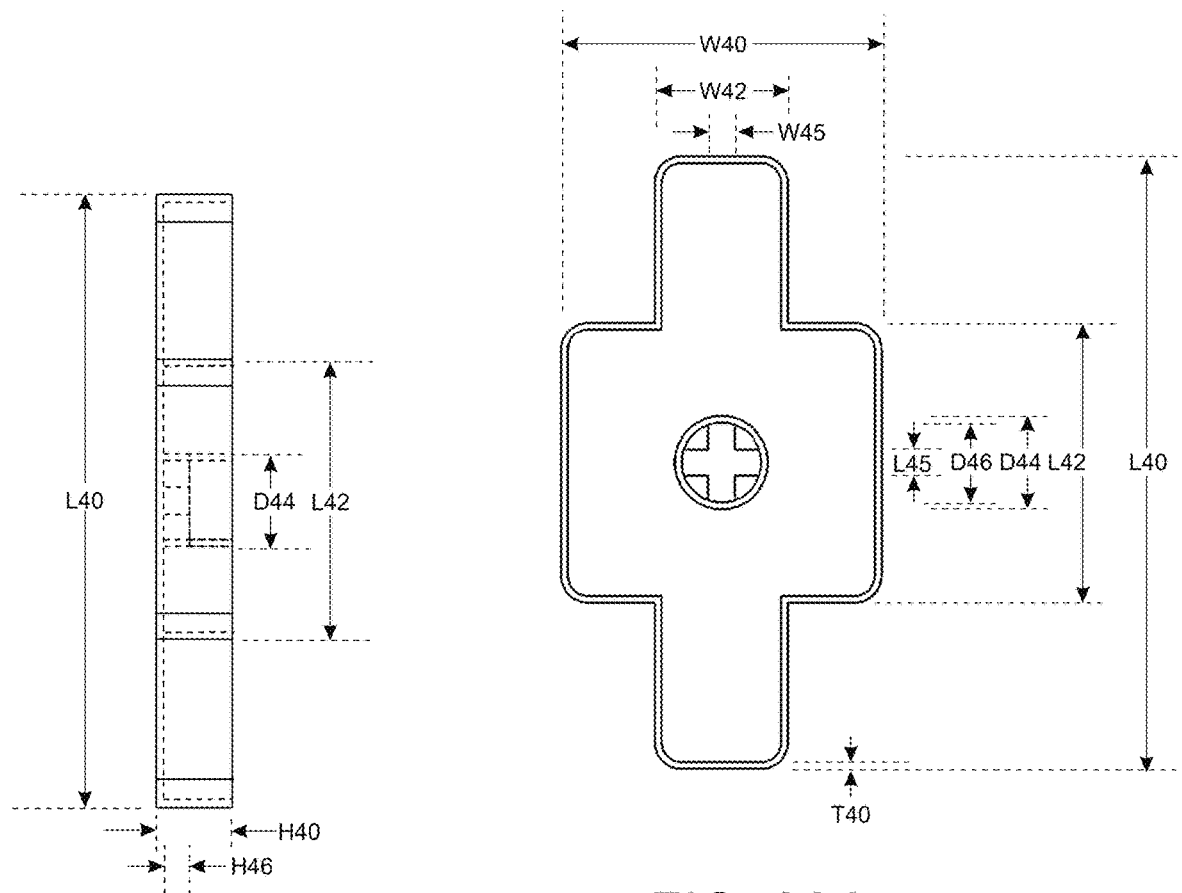
FIG. 28C
FIG. 28A
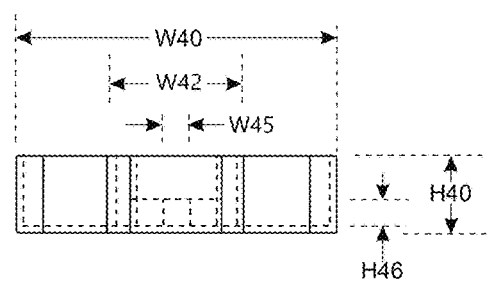
FIG. 28B

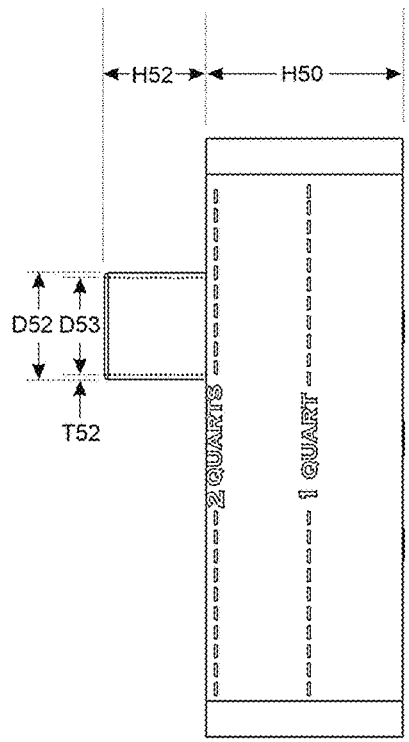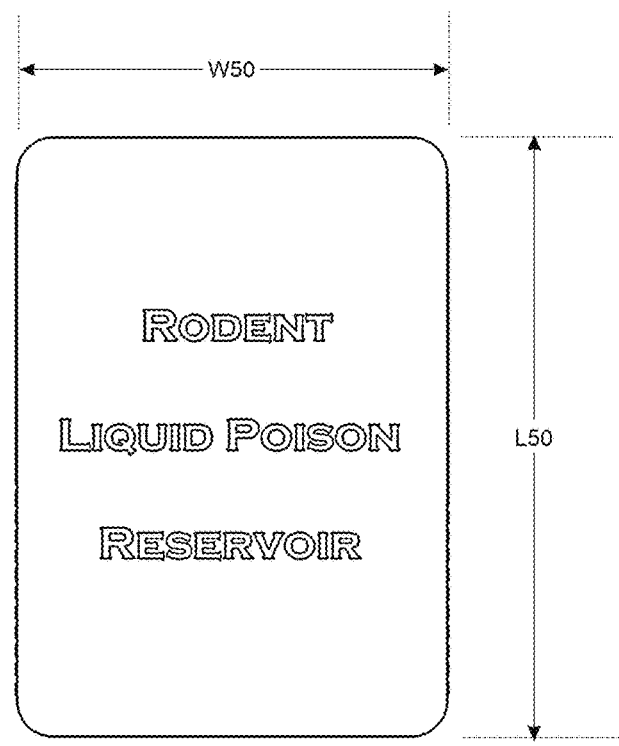
FIG. 29C   FIG. 29A
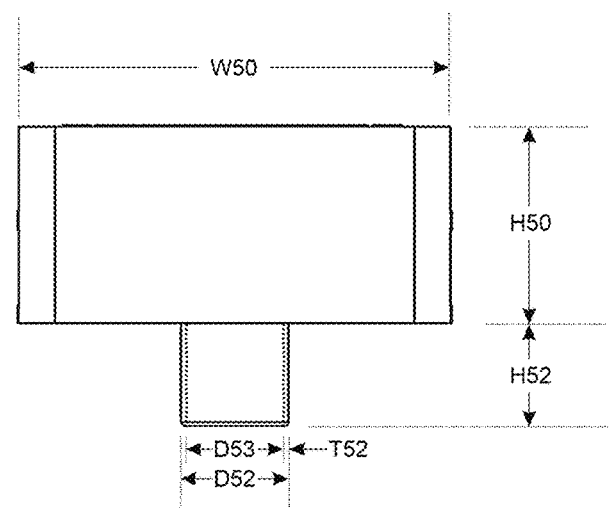
FIG. 29B

MULTI-FUNCTIONAL RODENT STATION

BACKGROUND OF THE INVENTION

The present invention relates to multi-functional rodent stations.

Rodents can be found in and around every town and farm in the United States (U.S.) and it is estimated that there is one rodent for every person living in the U.S., and rodents have followed humans to almost all parts of the world. Rodents are so closely linked to humans they are called domestic rodents and humans supply their three basic needs: food; shelter; and water.

Rodents are a threat to health, and they interfere with our economic and physical well being. Rodents are destructive pests and serious safety hazards, rodents start fires by gnawing on electric cables, rodents eat large amounts of food, and rodents contaminate even more with food their urine, feces, and hair, and at least 20 percent of the world's food is eaten or contaminated by rodents each year. Rodents damage structures, books, furniture, even appliances, through gnawing and burrowing. Rodents spread disease to humans and other animals through their bite, by transporting fleas, lice, mites and ticks, and by leaving their droppings in food and other materials that humans contact. Rodents are vectors for bubonic plague, rat bite fever, leptospirosis, hantavirus, trichinosis, infectious jaundice, rat mite dermatitis, *salmonellosis*, pulmonary fever, and typhus. Mice have been linked to asthma, and rodents may bite babies in their cribs because the smell of milk or other food on the baby is attractive to a rodent looking for food.

Rodents can be found in our homes, supermarkets, restaurants, livestock pens, and farm fields. Warehouses, grain mills, elevators, silos and corncribs are especially vulnerable to rodent infestation. Rodents will eat anything humans or livestock eat. Rats in particular are active at night and are seldom seen during the day except when populations are exceedingly large. Rodents can crawl through very small crevices, which makes it hard to confine their movement. Even if rodents are unseen, they may be heard moving after dark. A pet may be aware of a lurking rodent, however cats and dogs are not much of a deterrent to rodents.

Rodents find their way into approximately 21 million U.S. homes each winter. According to a survey by the National Pest Management Association (NPMA), nearly one-third of Americans have had a rodent problem in their home. Different types of rodents typically invade homes during the fall and winter in search of food and shelter as the climate cools, although rodents can still pose problems throughout the rest of the year. The majority of homeowners surveyed reported rodent sightings in the kitchen, as well as the basement and living room to lesser extent.

Rodent problems inside a home or business can pose a significant threat to both health and property. Various types of common rodents are known to spread *Salmonella* and other bacteria. Rodents are also capable of triggering allergies and asthma attacks. Rodents can also carry disease-causing parasites, such as ticks, fleas and lice. In addition to these health threats, rodents are known to damage drywall as well as wood and can also chew through electrical wires, increasing the risk of electrical fires.

Proper rodent prevention measures and awareness are essential to keep both people and property safe. Rats can squeeze through entries the size of a quarter while mice can fit through holes as small as a quarter of an inch in width. Once inside, females can breed quickly. For example, a single female mouse can have as many as twelve young every three weeks, allowing infestations to quickly grow.

Deer mice are found throughout the United States. Deer mice prefer to nest in rural areas in places like old fence posts, tree hollows and log piles. Deer mice are rarely a problem in residential settings, but they can wander indoors during the winter months while searching for shelter and food. Deer mice will often take up residence in sheds, barns or cabins during the off season. Deer mice are the most common carrier of hantavirus, a group of viruses spread by rodents that can cause kidney, blood or respiratory ailments and can sometimes be fatal in humans. The virus is transmitted primarily by the inhalation of dust particles contaminated with the urine, feces or saliva of infected deer mice.

House mice are the most commonly encountered rodent species and can be found throughout the United States. House mice typically nest in dark, secluded areas inside of structures. House mice are excellent climbers and can jump up to a foot in height, allowing them to reach isolated or withdrawn areas. House mice can cause significant property damage by chewing through materials like drywall and insulation. Additionally, house mice have been known to spark electrical fires by gnawing on wires inside homes. House mice can also pose serious health threats, capable of contaminating stored food and spreading diseases such as *Salmonella*. House mice weight is typically 40-45 grams.

Norway rats are widespread and can be found throughout the United States. Norway rats are primarily nocturnal and often burrow into piles of garbage or underneath concrete slabs. Norway rats tend to enter homes in the fall when outdoor food sources become scarce, typically nesting in basements, crawlspaces and other undisturbed dwellings once inside. Norway rats can cause serious property damage by gnawing through various materials, including plastic and lead pipes. Norway rats are also vectors of disease, including the plague, jaundice, rat-bite fever and cowpox virus. Additionally, Norway rats can bring fleas and mites inside the home.

Roof rats can be found throughout the U.S. coastal states and southern third of the country. Roof rats typically live in colonies and prefer to nest in the upper areas of structures or trees. Historically, roof rats and the fleas they carry have been associated with the bubonic plague. Although cases are rare, roof rats can also spread diseases like typhus, jaundice and trichinosis.

The Black Death killed as many as 25 million people in Europe in the 1300s. Scientists believe the Black Death (also known as the Pestilence, the Great Mortality or the Plague, or bacterium *Yersinia pestis*) was a bubonic plague pandemic occurring in Afro-Eurasia from 1346 to 1353. It is the most fatal pandemic recorded in human history, causing the death of 75-200 million people in Eurasia and North Africa, peaking in Europe from 1347 to 1351. *Yersinia pestis* typically infects the Oriental rat flea, which in turn infects small rodents such as mice, rodents and squirrels. As their rodent hosts die, infected fleas seek and bite humans.

Rats are naturally nocturnal creatures, have poor eyesight, and can best see blues as blurry edges, and rats and mice are believed to be color blind. Rats use their limited sight and other senses to navigate the environment, find food, and recognize one another in the dark.

Some traps are capable of trapping and killing multiple rodents and glue traps are sometimes used with some success, however, rodents often step onto the glue, recognize the danger, and get away.

The extensive damage caused by rodents is evidence that better traps are needed.

BRIEF SUMMARY OF THE INVENTION

The present invention addresses the above and other needs by providing a Rodent Multi-functional Station ("Station") designed to provide a flexible, secure, and highly effective solution for controlling rodent populations. The Station is suitable for both indoor and outdoor use, offering a wide range of advantages that improve safety, versatility, and ease of use in residential, commercial, and industrial settings. The Station is modular, accommodating various types of traps, poisons, and baits currently available in the market.

The Station is designed to be used in a variety of environments, including both indoor and outdoor settings. This versatility ensures that users can implement rodent control solutions in homes, warehouses, industrial facilities, and other environments without limitations due to weather or exposure to elements.

The Station supports a wide range of rodent control methods, accommodating traps and poisons available in today's market. It can be used with glue traps, snap traps, reusable traps, poison blocks, poison pellets, soft baits, rodent tracking powders, and even liquid poisons, offering flexibility for different rodent control strategies.

In accordance with one aspect of the invention, there is provided a Station having several housing configurations of traps and poisons, including: One large rodent glue trap, or up to four mice glue traps; One large wooden snap trap, or up to six mice wooden snap traps; four large reusable snap traps, or up to nine mice reusable snap traps; poison blocks, poison pellets, tracking powders, soft baits, and up to 2 quarts of liquid poison.

In accordance with another aspect of the invention, there is provided a Station having a main body liner designed to collect dirt, droppings, urine, blood, scattered poison, and other debris. Additionally, the body liner can be treated with salt to expel slugs, snails, and ants, preventing these pests from ruining the poison baits. The main body liner simplifies cleaning and maintenance by containing contaminants within the station.

In accordance with yet another aspect of the invention, there is provided a Station that will be made of thick HDPE plastic, which is strong enough for pets and children and unable to break apart.

In accordance with yet another aspect of the invention, there is provided a Station the liquid poison reservoir would be clear and thick PET plastic and marked with quantity levels. The reservoir will be large enough to hold between 1 quart and up to 2 quarts.

In accordance with yet another aspect of the invention, there is provided a Station having a liquid poison dispenser that is safe for non-targeted pests or other animals and most importantly safe for children.

In accordance with yet another aspect of the invention, there is provided a Station having a warning statement on the top cover for additional safety.

In accordance with yet another aspect of the invention, there is provided a Station having a liquid or pellet container which can be used for liquid poison, tracking powder, or pellet baits.

In accordance with yet another aspect of the invention, there is provided a Station having nine entries for rodents to get in conveniently and easily. The rodent entries are preferably 3 inches above the floor, so some insects, such as crickets, cannot enter the station to ruin the bait blocks, wet baits, or pellet baits.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4 is a perspective view of a main body of the Station according to the present invention.

FIG. 4A is a top view of the main body of the Station according to the present invention.

FIG. 4B is a front view of the main body of the Station according to the present invention.

FIG. 4C is a side view of the main body of the Station according to the present invention.

FIG. 6 is a perspective view of a main body liner of the Station according to the present invention.

FIG. 6A is a top view of the main body liner of the Station according to the present invention.

FIG. 6B is a front view of the main body liner of the Station according to the present invention.

FIG. 6C is a side view of the main body liner of the Station according to the present invention.

FIG. 7 is a perspective view of a pellet container of the Station according to the present invention.

FIG. 28A is a top view of the pellet container showing dimensions according to the present invention.

FIG. 28B is a front view of the pellet container showing dimensions according to the present invention.

FIG. 28C is a side view the pellet container showing dimensions according to the present invention.

FIG. 29A is a top view of the liquid poison dispenser showing dimensions according to the present invention.

FIG. 29B is a front view of the liquid poison dispenser showing dimensions according to the present invention.

FIG. 29C is a side view the liquid poison dispenser showing dimensions according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
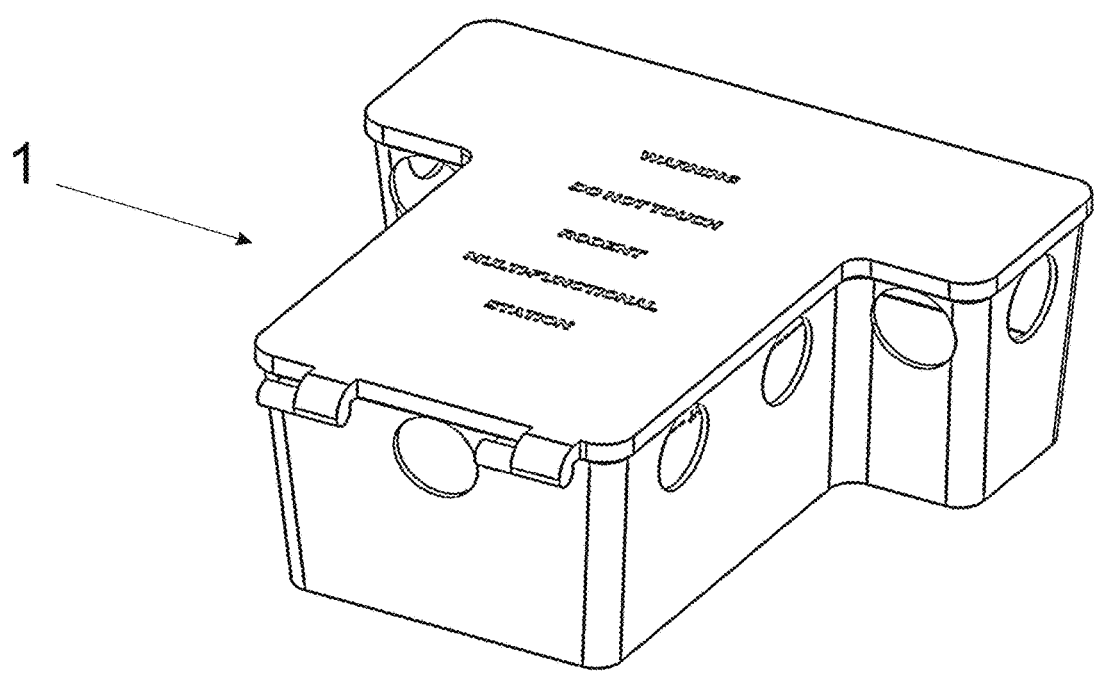
FIG. 1 is a perspective view of a Multi-functional Rodent Station ("Station") according to the present invention.
Figure 2:
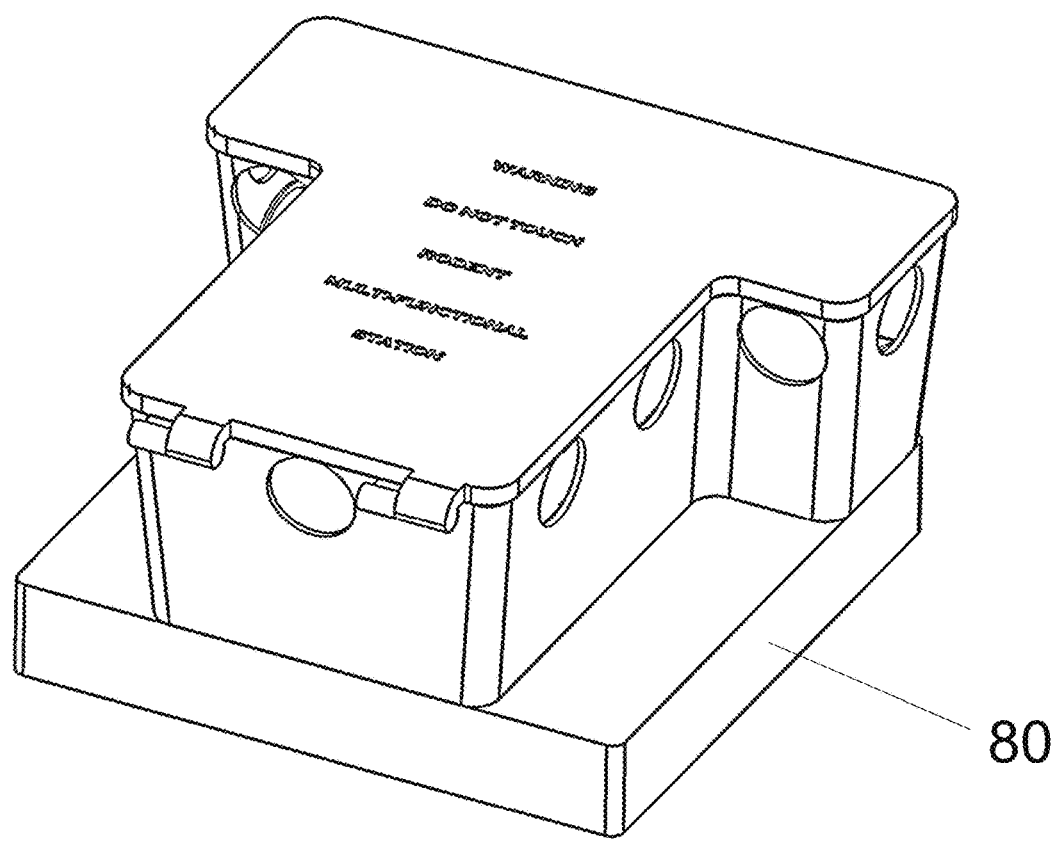
FIG. 2 is a perspective view of the Station on a concrete block according to the present invention.

A perspective view of the Rodent Multi-functional Station 1 is shown in FIG. 1 and the Rodent Multi-functional Station on a concrete block 80 is shown in FIG. 2.

Figure 3:
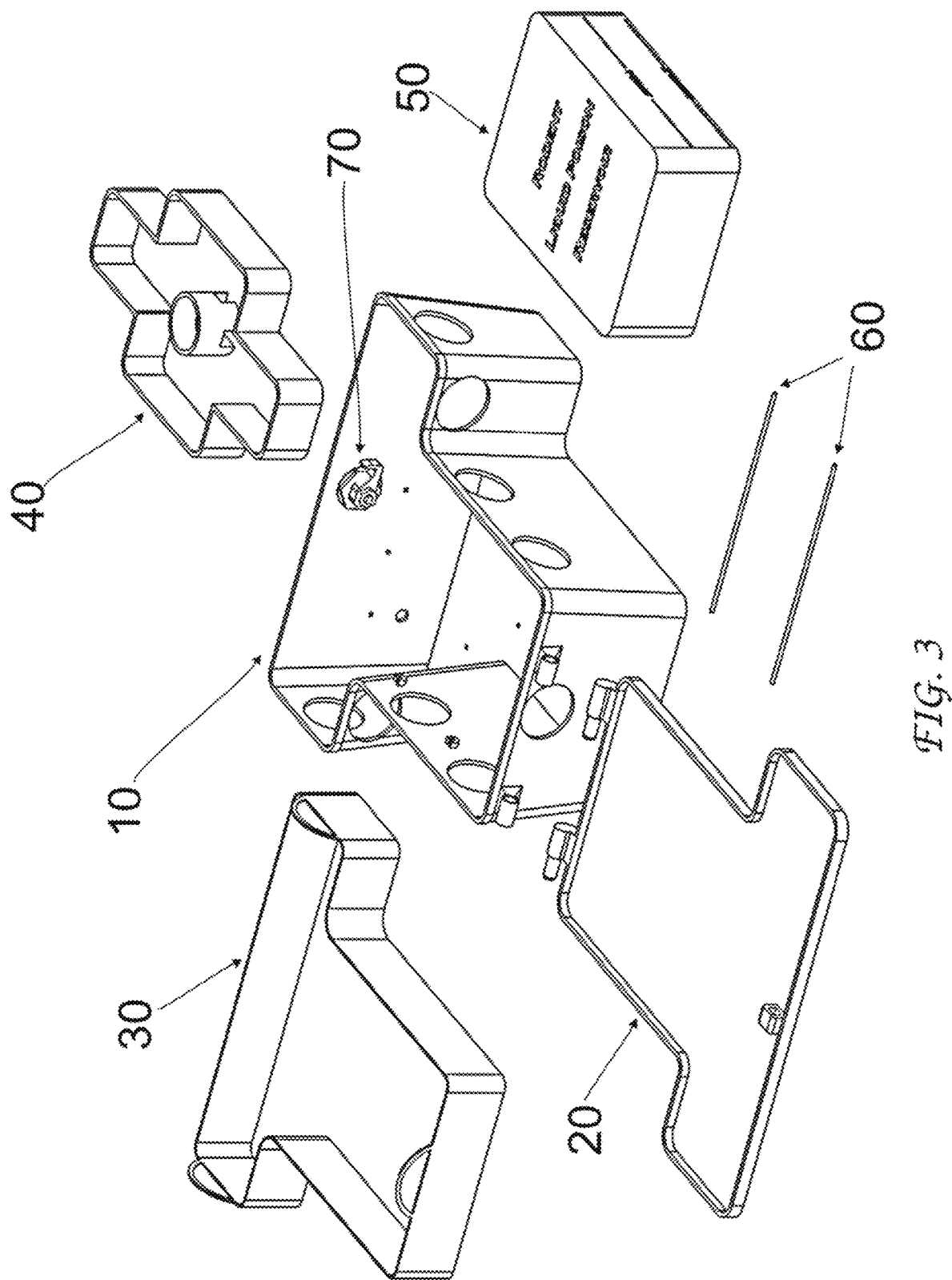
FIG. 3 is a exploded perspective view of the Station according to the present invention.

An exploded view of the Rodent Multi-functional Station 1, displaying its key modular components is shown in FIG. 3. A main body 10 forms the core structure, housing various traps and baits while allowing rodent access through strategically placed entry points. Attached to the main body 10 is the top cover 20, which secures the contents using a tubular cam lock 70, providing protection against tampering. Inside the main body 10, the liner 30 collects debris such as droppings, poison residues, and dirt, ensuring easy cleanup and maintenance. The liquid or pellet container 40 resides in the liner 30 and accommodates either liquid poison or pellet bait, offering flexibility for various rodent control strategies. For liquid poison applications, the liquid poison dispenser 50 safely stores and dispenses the poison, designed with quantity level indicators for proper monitoring. Metal rods 60 are installed within the main body to suspend bait blocks or soft baits, ensuring optimal rodent exposure. Together, these components form a versatile, secure, and effective rodent control solution suitable for residential, commercial, or industrial use.

FIG. 4, FIG. 4A, FIG. 4B, and FIG. 4C collectively depict various views of the Main Body 10 of the rodent multifunctional station 1. The main body consists of the bottom floor 11 and the inner top floor 12, forming a sturdy two-tier structure designed to accommodate various rodent control mechanisms. The body 10 is equipped with knuckles 13 on the front side, which facilitate the attachment of the top cover via a hinge mechanism, ensuring secure closure. Distributed across the side walls are rodent entries 19, allowing easy access for rodents into the station. Holes 14 for the tubular cam lock 70 see FIG. 3 are present at the top for locking the cover, and holes for security cables 15 and holes for nails or screws 16 enable the station to be securely fastened to walls or surfaces, preventing tampering or unauthorized movement. Additionally, drainage points 17 on the bottom floor 11 help prevent the buildup of liquids, and rod holders 18 are integrated into the structure to hold bait blocks or soft bait. The top view in FIG. 4A shows the arrangement of these internal elements, while FIG. 4B and FIG. 4C provide front and side views that emphasize the placement of the knuckles 13, rodent entries 19, and the overall sturdy design that supports the station's functionality and security. Together, these figures illustrate a robust and adaptable main body 10.

Figure 5:
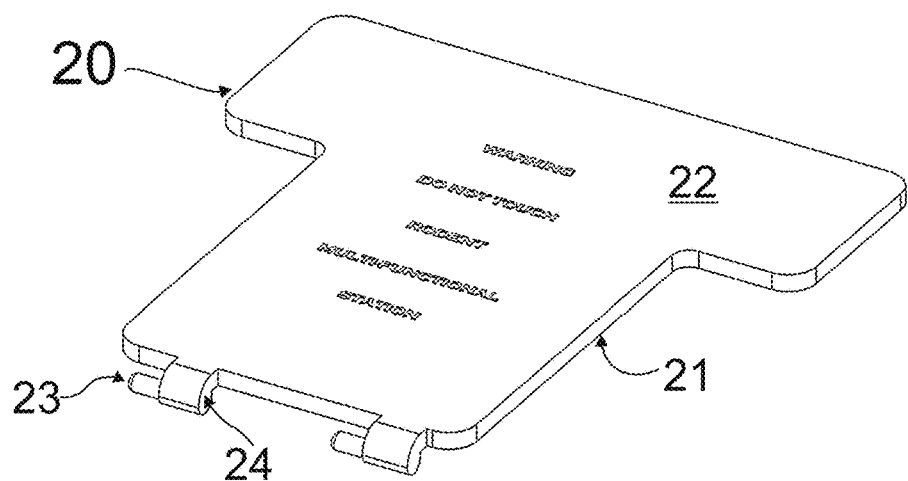
FIG. 5 is a perspective view of a top cover of the Station according to the present invention.
Figures 5A, 5C:
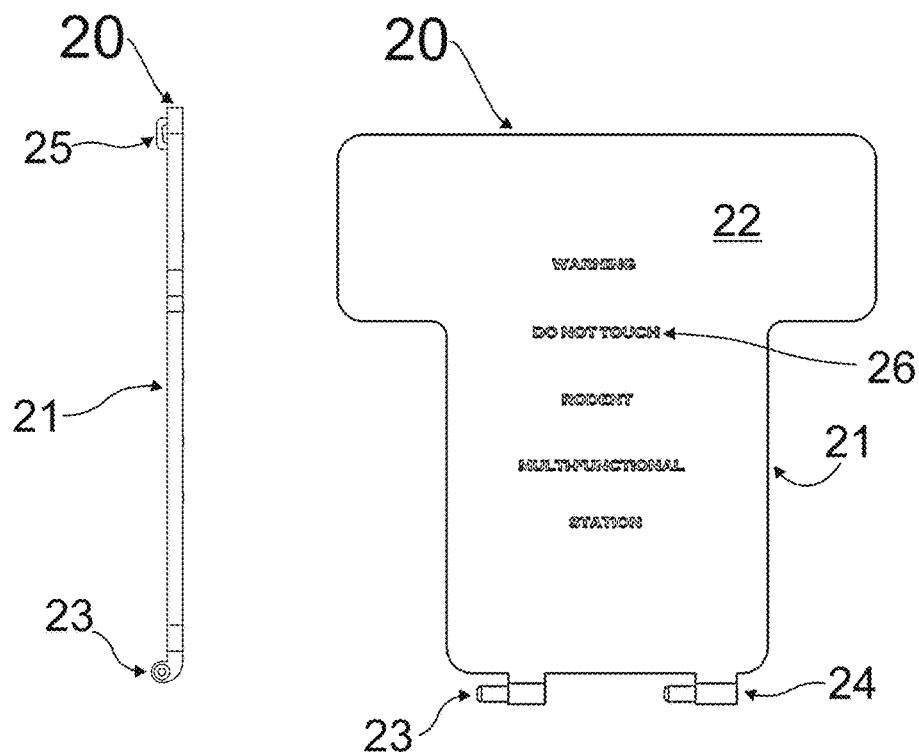
FIG. 5A is a top view of a top cover of the Station according to the present invention.
FIG. 5C is a side view of a top cover of the Station according to the present invention.
Figure 5B:
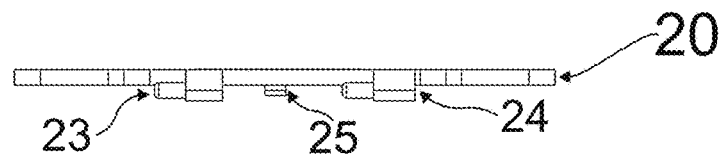
FIG. 5B is a front view of a top cover of the Station according to the present invention.

FIG. 5, FIG. 5A, FIG. 5B, and FIG. 5C provide detailed views of the Top Cover 20 of the rodent multifunctional station 1. The top cover 20 features a cover top 22 with a flat surface that includes an engraved or printed warning statement 26 to deter tampering by unauthorized individuals or children. The cover 20 is designed with a bottom floor 21 that interfaces securely with the main body of the station. Pins 23 and pin bases 24 are located along the bottom edge of the cover 20, facilitating attachment to the knuckles 13 of the main body 10 see FIG. 4, allowing the cover 20 to open and close smoothly. Additionally, the cover 20 is equipped with a locking slot 25, which interacts with the station's tubular cam lock 70 to ensure secure closure. FIG. 5A illustrates the top-down view of the cover 20, showcasing the layout of the warning label and the positioning of the pins and locking slot. FIG. 5B and FIG. 5C present front and side views, respectively, highlighting the alignment and thickness of the cover 20, as well as the robust locking and hinge components that contribute to the station's overall security and functionality.

FIG. 6, FIG. 6A, FIG. 6B, and FIG. 6C depict the Main Body Liner 30 of the rodent multifunctional station 1. The liner 30 is designed to fit inside the main body 10 of the station 1 and serves as a removable tray for collecting dirt, droppings, and other debris. FIG. 6 shows a trimetric view of the liner 30, which includes a bottom floor 31 and side walls 32 to contain waste and scattered bait. The top floor 33 of the liner 30 aligns with the structure of the main body 10 to ensure a snug fit. FIG. 6A, a top view, highlights the overall shape of the liner 30 and the positioning of its components, while FIG. 6B provides a front view that shows the placement of the front handle 36 and its perimeter 37, allowing for easy removal of the liner 30 from the station 1. Side handles 34 and their corresponding perimeter 35 are visible in FIG. 6C, a side view, ensuring that the liner 30 can be conveniently lifted for cleaning. The handles are ergonomically positioned to facilitate smooth removal and reinsertion, making maintenance easy and efficient. This liner 30 conveniently maintain cleanliness and prolong the effectiveness of the bait or traps inside the station 1.

Figure 7C:
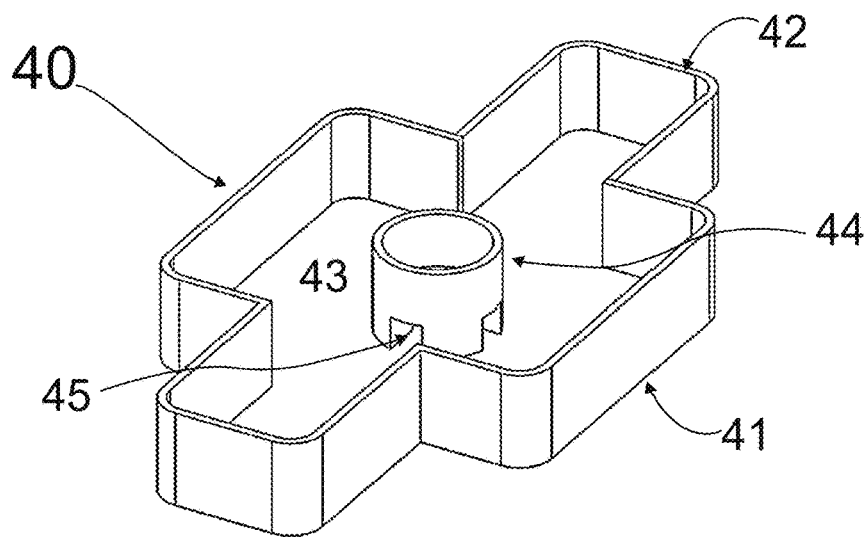
FIG. 7C is a side view of the pellet container of the Station according to the present invention.
Figure 7A:
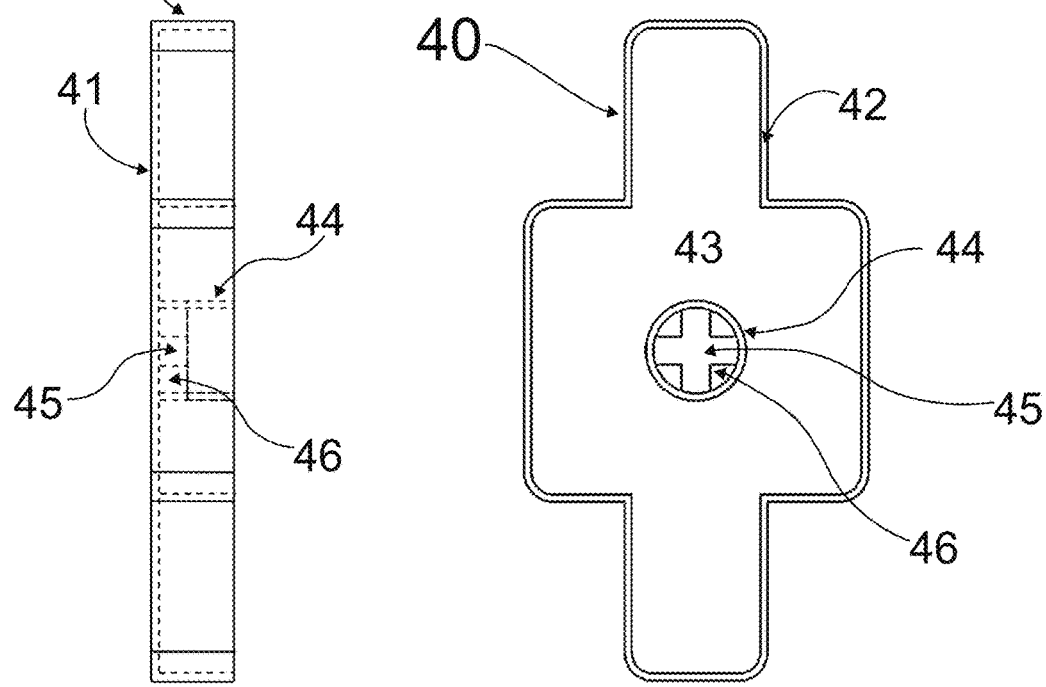
FIG. 7A is a top view of the pellet container of the Station according to the present invention.
Figure 7B:
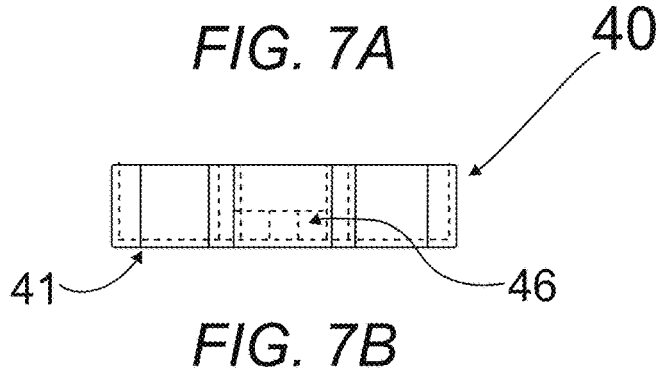
FIG. 7B is a front view of the pellet container of the Station according to the present invention.

FIG. 7, FIG. 7A, FIG. 7B, and FIG. 7C depict the Liquid or Pellet Container 40 of the rodent multifunctional station 1, designed to hold either liquid poison or pellet baits. FIG. 7 shows a trimetric view of the container 40, which includes a bottom floor 41 and top edges 42 that form the outer structure of the container. Inside the container 40, a central liquid reservoir holder 44 is present to securely hold liquid poison containers. Surrounding the reservoir are liquid outlets 45, which allow liquid poison to flow out for rodent consumption. FIG. 7A, a top view, highlights the overall shape of the container 40, emphasizing the central reservoir holder and the liquid outlets. FIG. 7B provides a front view, showing the height and arrangement of the liquid reservoir stands 46, which support the reservoir and elevate it slightly above the bottom floor for proper liquid flow. FIG. 7C, a side view, further details the positioning of the liquid outlets 45 and liquid reservoir holder 44, ensuring that the liquid is dispensed evenly within the station 1. This container is designed for versatility, capable of holding different types of bait, including tracking powder, pellet bait, or liquid poison, providing an adaptable solution for various rodent control methods.

Figure 8:
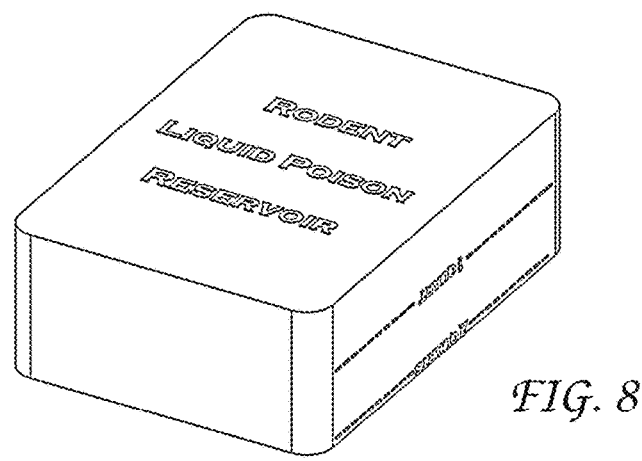
FIG. 8 is a perspective view of a liquid poison dispenser of the Station according to the present invention.
Figure 8C:
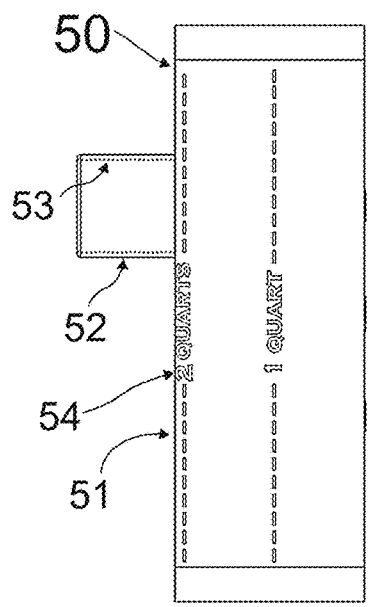
FIG. 8C is a side view of the liquid poison dispenser of the Station according to the present invention.
Figure 8A:
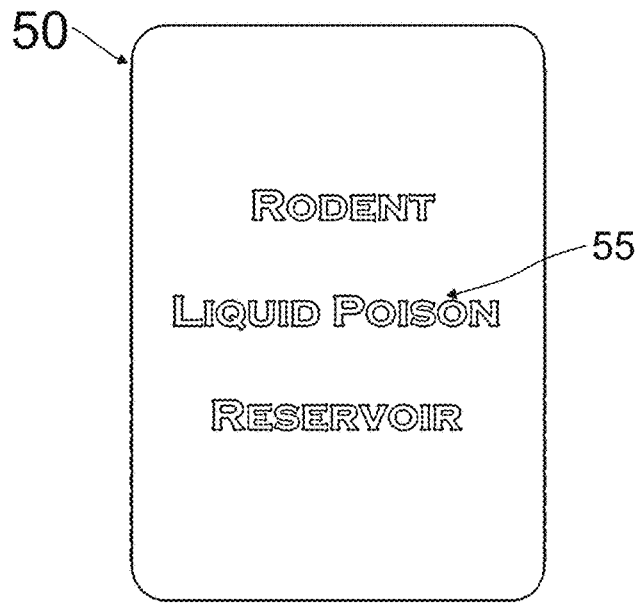
FIG. 8A is a top view of the liquid poison dispenser of the Station according to the present invention.
Figure 8B:
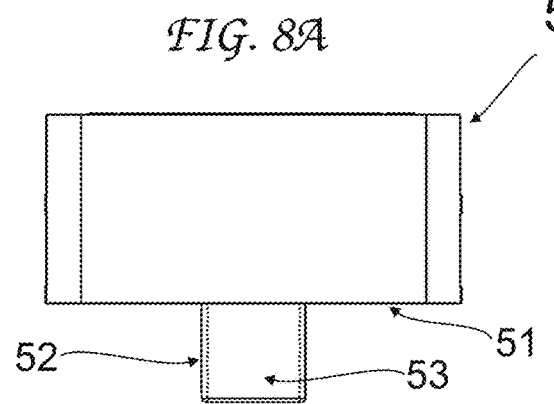
FIG. 8B is a front view of the liquid poison dispenser of the Station according to the present invention.

FIG. 8, FIG. 8A, FIG. 8B, and FIG. 8C illustrate the Liquid Poison Reservoir 50 for the rodent multifunctional station 1. The reservoir 50 is designed to store and dispense liquid poison in a controlled manner. FIG. 8 shows a perspective view of the reservoir, with the words "Rodent Liquid Poison Reservoir" engraved or printed on the top surface 55 for clear identification. FIG. 8A, a top view, further emphasizes this labeling, ensuring visibility for safe use. The reservoir 50 is rectangular, with a bottom floor 51 that includes an extended liquid outlet 52. FIG. 8B provides a front view, showcasing the outlet 52 with an attached inner liquid outlet 53, which allows for precise dispensing of the liquid poison. FIG. 8C, a side view, highlights the capacity markers 54 on the side of the reservoir 50, showing measurements for 1 quart and 2 quarts, enabling easy monitoring of the poison level. The reservoir 50 is made from durable, clear plastic for visibility and durability, and it is designed to prevent spillage while ensuring the safe containment of liquid poison, making it ideal for use in industrial, commercial, and residential environments.

Figure 9:
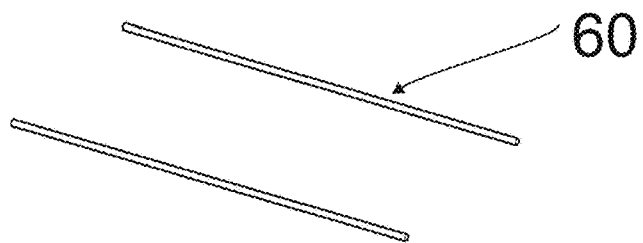
FIG. 9 is a perspective view of a rod for hanging bait blocks and soft baits according to the present invention.
Figure 10:
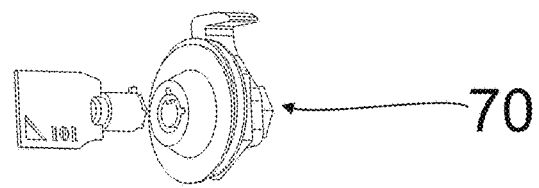
FIG. 10 is a perspective view of a tubular cam lock according to the present invention.
Figure 11:
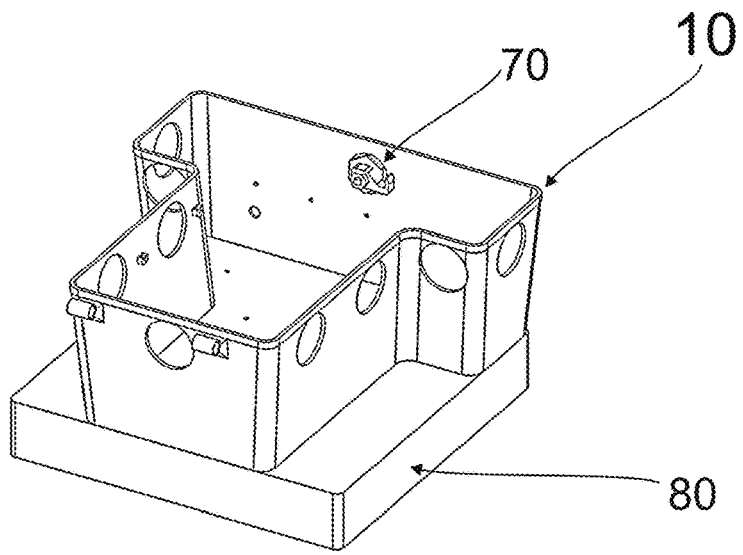
FIG. 11 is a perspective view of the main body with the tubular cam lock, the main body residing on top of the concrete block according to the present invention.
Figure 12:
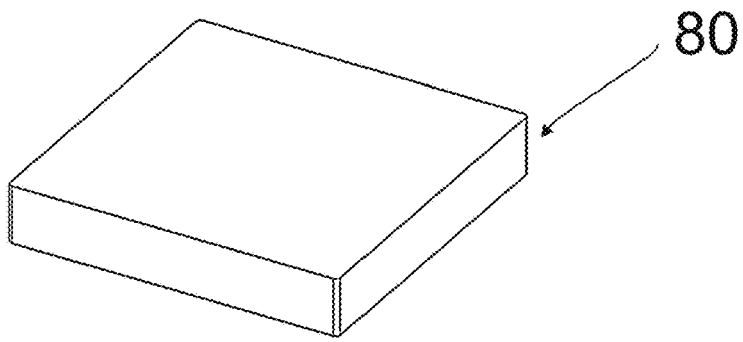
FIG. 12 is a perspective view of the 12"×12"×1.57" standard concrete block according to the present invention.

FIG. 9, FIG. 10, FIG. 11, and FIG. 12 depict various components of the rodent multifunctional station. FIG. 9 shows the metal rods 60, which are used inside the main body 10 of the station 1 to hold bait blocks or soft baits securely in place, preventing rodents from removing the bait. FIG. 10 illustrates the tubular cam lock 70, a security mechanism designed to lock the top cover 20 to the main body 10, ensuring the station 1 remains tamper-proof. The lock 70 provides an additional layer of security by preventing unauthorized access to the station's contents. FIG. 11 presents an assembled view of the main body 10 of the station 1, with the tubular cam lock 70 in place, securely fastening the top cover 20. Additionally, the concrete block 80 is shown placed at the base of the station 1 to provide stability and prevent the station 1 from being moved or displaced by larger animals or environmental factors. Finally, FIG. 12 gives a standalone view of the concrete block 80, which serves as an optional weight to ensure the station 1 remains stationary in outdoor or high-traffic environments. Together, these components enhance the station's functionality, security, and stability for effective rodent control.

Figure 13:
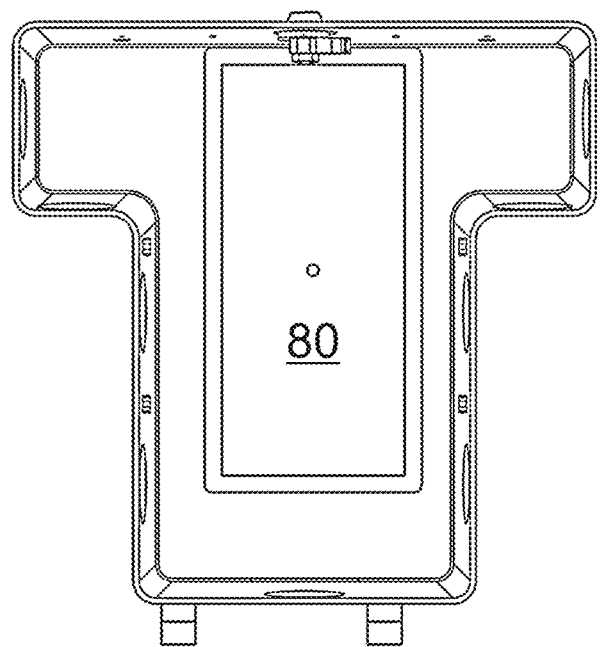
FIG. 13 is a top view of the main body with a large glue trap residing therein according to the present invention.
Figure 14:
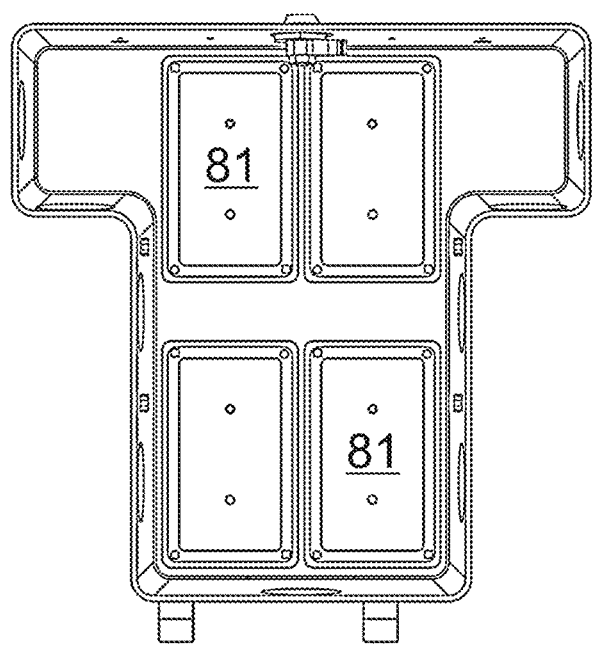
FIG. 14 is a top view of the main body with mice glue traps residing therein according to the present invention.

FIG. 13 and FIG. 14 depict different configurations of traps inside the Rodent Multifunctional Station 1. FIG. 13 illustrates the placement of a single large glue trap 80 inside the station 1, covering the central area of the main body 10. This configuration is ideal for capturing larger rodents, allowing them to enter from any of the multiple entry points and become trapped on the adhesive surface. FIG. 14 presents an alternative configuration, showing the use of four smaller glue traps 81. These traps are arranged symmetrically within the main body 10, maximizing the coverage area and increasing the chances of trapping multiple rodents simultaneously. This setup is particularly effective for managing infestations of smaller rodents, such as mice, providing flexibility in the use of different trap sizes based on the specific pest control requirements. Both figures emphasize the adaptability of the station 1 for various trapping methods, ensuring optimal rodent capture while maintaining a clean and organized interior.

Figure 15:
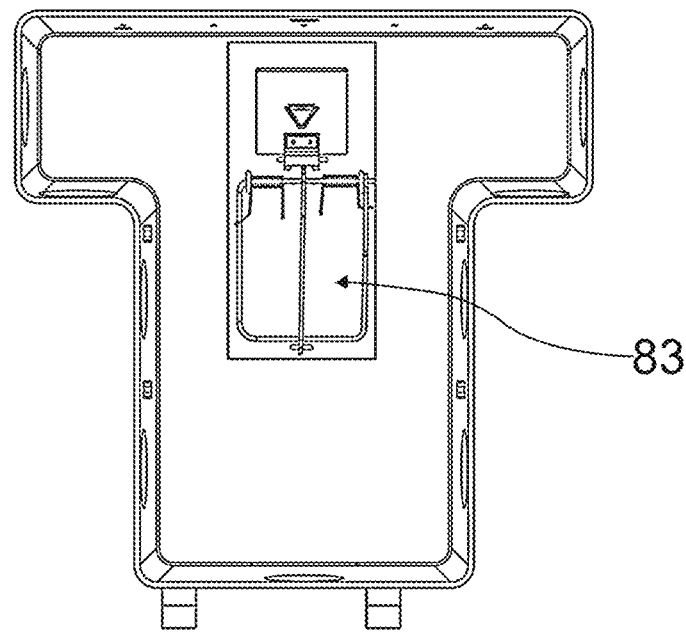
FIG. 15 is a top view of the main body with a large snap trap residing therein according to the present invention.
Figure 16:
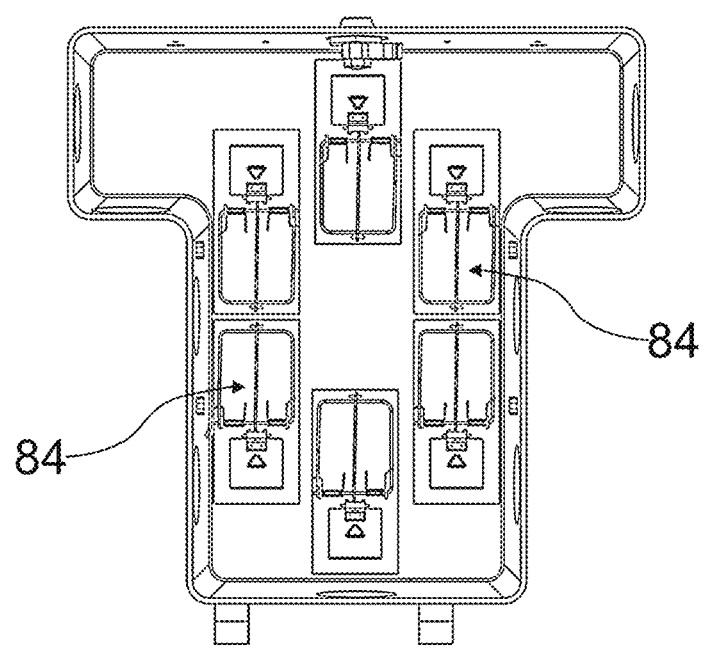
FIG. 16 is a top view of the main body with a plurality of small snap traps residing therein according to the present invention.

FIG. 15 and FIG. 16 illustrate different configurations of snap traps 83 and 84 placed inside the Rodent Multifunctional Station 1. FIG. 15 shows the use of a large wooden snap trap 83 positioned centrally within the station 1, ideal for capturing larger rodents. The placement of the snap traps 83, or 84 ensures that the rodent is directed toward the snap traps 83 and 84 as it enters the station through any of the available entry points. In contrast, FIG. 16 displays a setup using multiple smaller wooden snap traps 84, arranged symmetrically within the main body of the station 1. This configuration allows for the simultaneous capture of multiple smaller rodents, such as mice, effectively increasing the station's efficiency in areas with higher rodent activity. Both figures highlight the versatility of the station in accommodating different types and sizes of traps, offering flexible options for pest control based on the specific size and number of rodents targeted.

Figure 17:
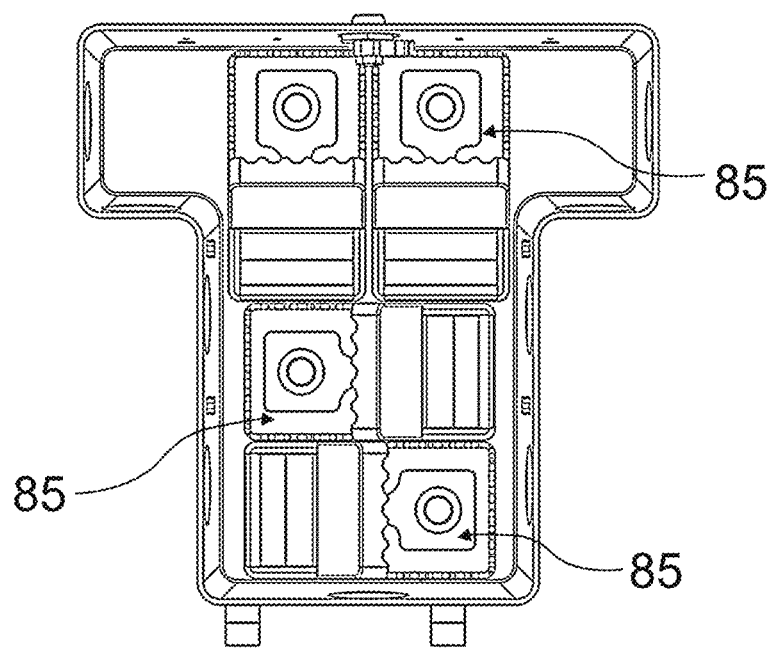
FIG. 17 is a top view of the main body with a plurality of large reusable snap trap residing therein according to the present invention.
Figure 18:
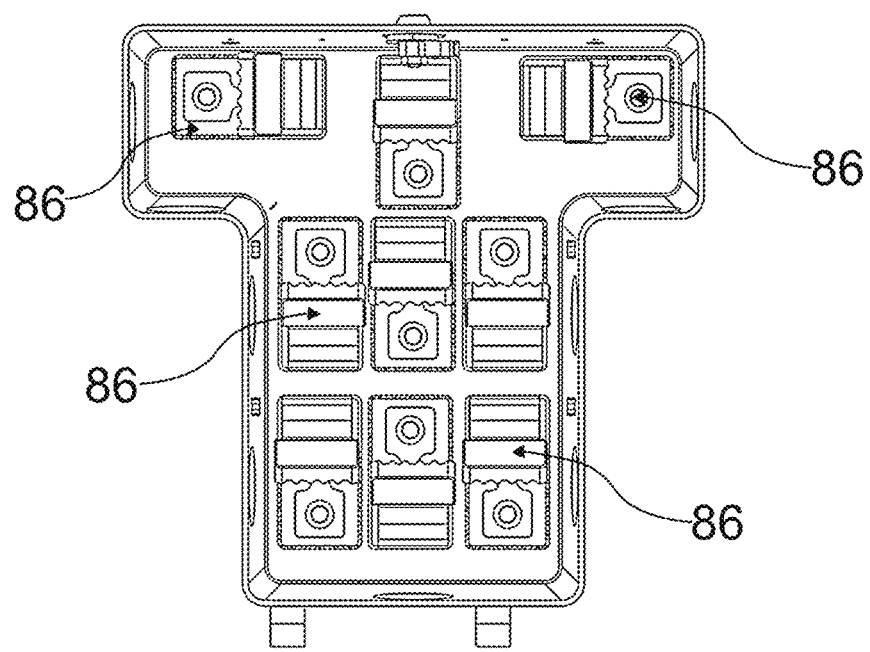
FIG. 18 is a top view of the main body with a plurality of small reusable snap trap residing therein according to the present invention.

FIG. 17 and FIG. 18 depict different configurations of reusable snap traps placed inside the Rodent Multifunctional Station 1. FIG. 17 shows an arrangement of four large reusable snap traps 85, positioned symmetrically within the station's main body 10. This configuration is suited for catching larger rodents, with each trap covering a significant area to maximize capture potential. FIG. 18 illustrates the use of multiple smaller reusable snap traps 86, arranged to cover the entire interior of the station 1. This setup is ideal for trapping multiple smaller rodents simultaneously, such as mice, and is particularly effective in areas with high rodent activity. Both configurations demonstrate the station's flexibility in supporting various trap sizes, allowing for customized rodent control strategies depending on the size and number of pests being targeted.

Figure 19:
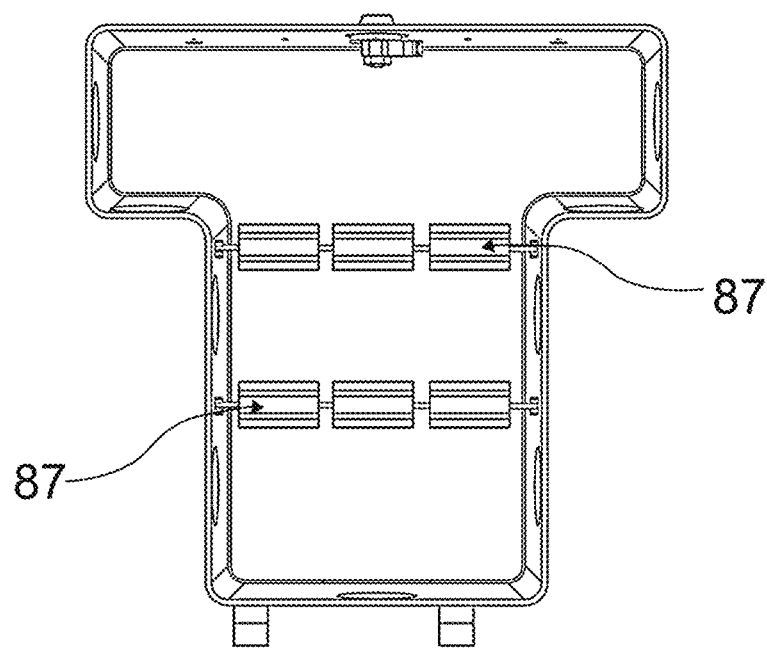
FIG. 19 is a top view of the main body with a plurality of poison bait blocks residing therein according to the present invention.
Figure 20:
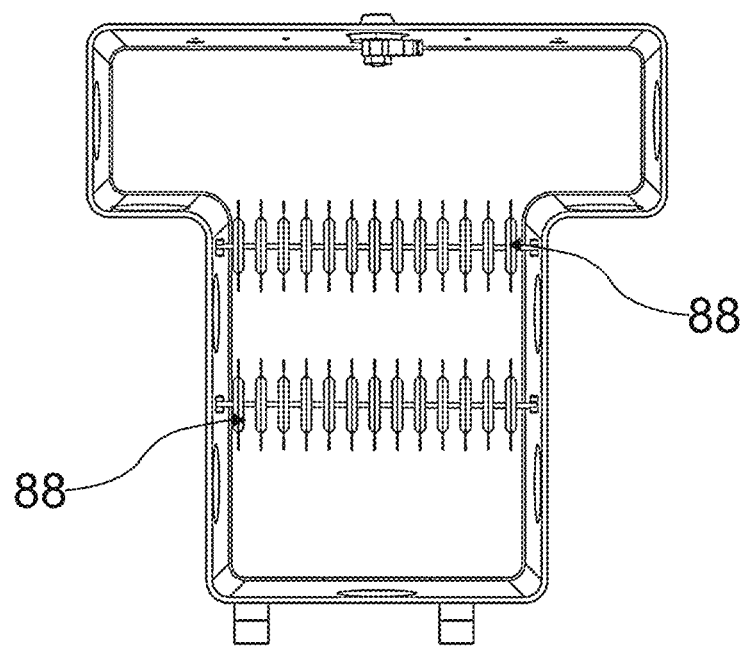
FIG. 20 is a top view of the main body with a plurality of soft baits blocks residing therein according to the present invention.

FIG. 19 and FIG. 20 illustrate the use of different types of rodent baits within the Rodent Multifunctional Station 1. FIG. 19 shows the placement of poison bait blocks 87 inside the station 1, arranged on the metal rods 60 to securely hold the blocks 87 in place. This setup ensures that rodents can access the bait while preventing the blocks from being easily removed or scattered. FIG. 20 depicts the use of soft baits 88, which are also arranged on the rods 60, but in larger quantities, filling the center of the station 1. This configuration is ideal for areas where soft baits are more effective, allowing multiple rodents to access the bait simultaneously. Both figures demonstrate the station's adaptability to different baiting methods, offering flexible solutions for controlling various rodent populations while ensuring that the baits are properly secured and efficiently utilized.

Figure 21:
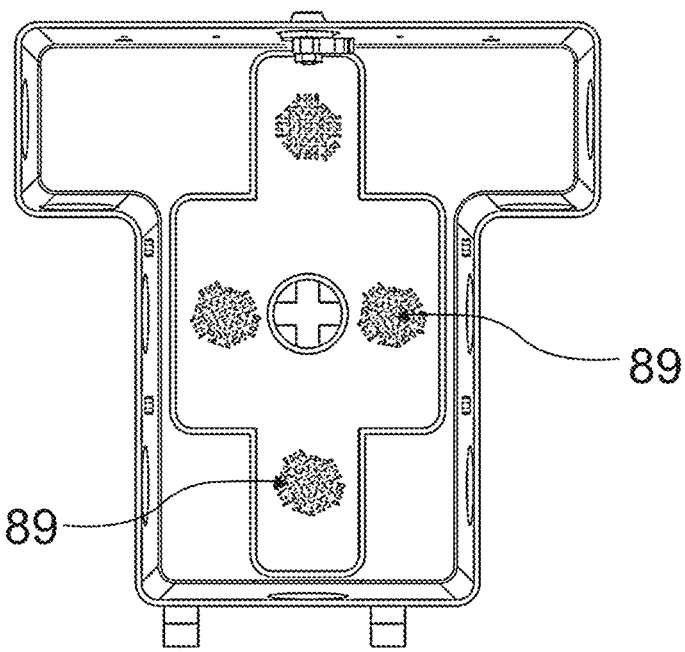
FIG. 21 is a top view of the main body with a plurality of poison pellets residing therein according to the present invention.
Figure 22:
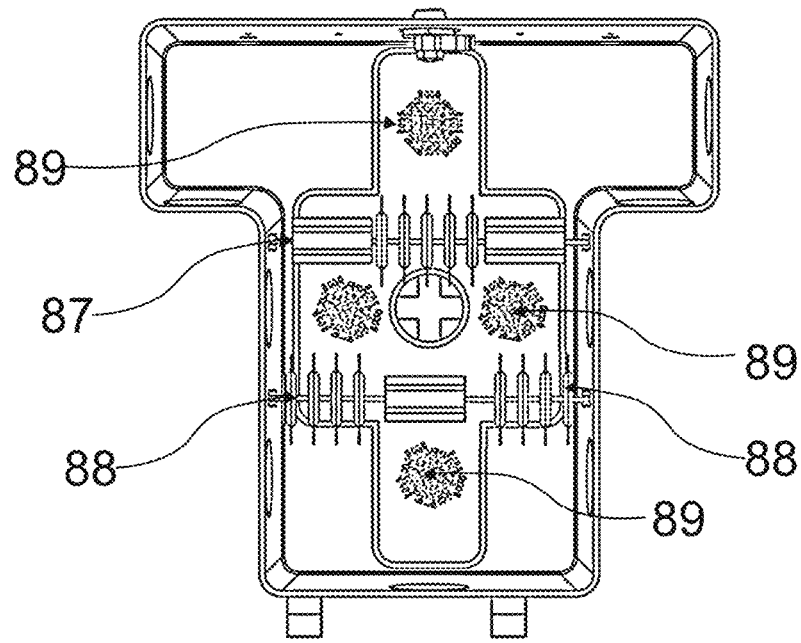
FIG. 22 is a top view of the main body with the poison bait blocks, the poison soft baits, and the poison pellets residing therein according to the present invention.

FIG. 21 and FIG. 22 demonstrate the use of poison pellets 89 and a combination of various baits within the Rodent Multifunctional Station 1. FIG. 21 shows an arrangement where poison pellets 89 are distributed at strategic locations within the station 1, ensuring that rodents have access to the pellets from multiple entry points. The pellets 89 are placed securely to avoid scattering, maximizing their effectiveness. FIG. 22 presents a more comprehensive baiting setup, incorporating poison bait blocks 87, soft baits 88, and poison pellets 89 in a single configuration. The bait blocks 87 and soft baits 88 are mounted on the rods 60, while the pellets are positioned in various corners of the station. This combination of baiting methods offers a versatile solution for targeting different rodent preferences, ensuring that multiple bait types are available to increase the likelihood of rodent consumption and effective control. This setup demonstrates the station's adaptability for various baiting strategies in diverse environments.

Figure 23:
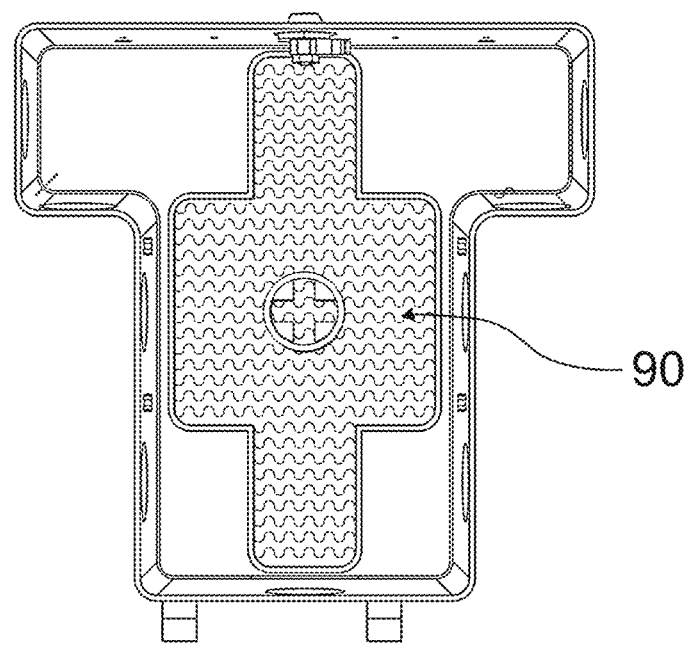
FIG. 23 is a top view of the main body with the liquid poison in a tray residing therein according to the present invention.
Figure 24:
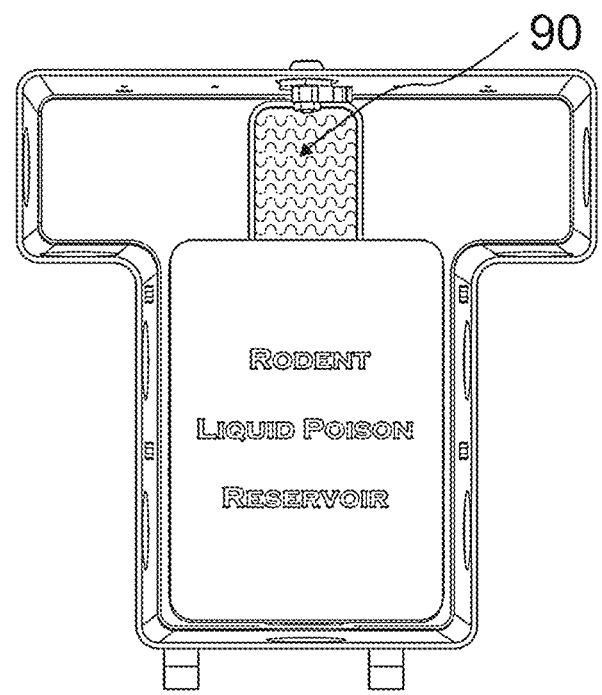
FIG. 24 is a top view of the main body with the liquid poison in the tray and the liquid poison dispenser above the tray all residing therein according to the present invention.

FIG. 23 and FIG. 24 illustrate the use of liquid poison 90 within the Rodent Multifunctional Station 1. FIG. 23 shows the placement of liquid poison inside the station 1, where the liquid poison 90 is contained within the central area, designed for optimal rodent access. The liquid poison 90 is securely held in a designated tray, ensuring that it is easily accessible to rodents while preventing spillage or contamination of other bait types. FIG. 24 depicts the station with the Rodent Liquid Poison Reservoir 90 in place, showing the reservoir securely housed in the center of the station 1. The reservoir 90 is designed to store and dispense liquid poison in a controlled manner, marked with clear labeling to indicate its contents. This setup is ideal for areas requiring a continuous supply of liquid poison, offering a secure and efficient method for delivering the poison to rodents while maintaining safety for non-target animals and humans. The use of liquid poison enhances the station's versatility, making it suitable for environments where liquid baiting is more effective.

Figure 25C:
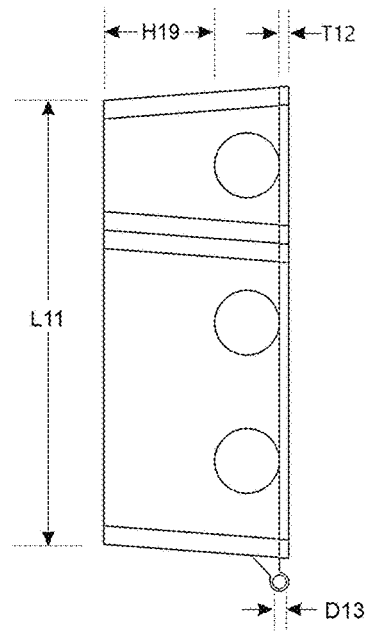
FIG. 25C is a side view the main body showing dimensions according to the present invention.
Figure 25A:
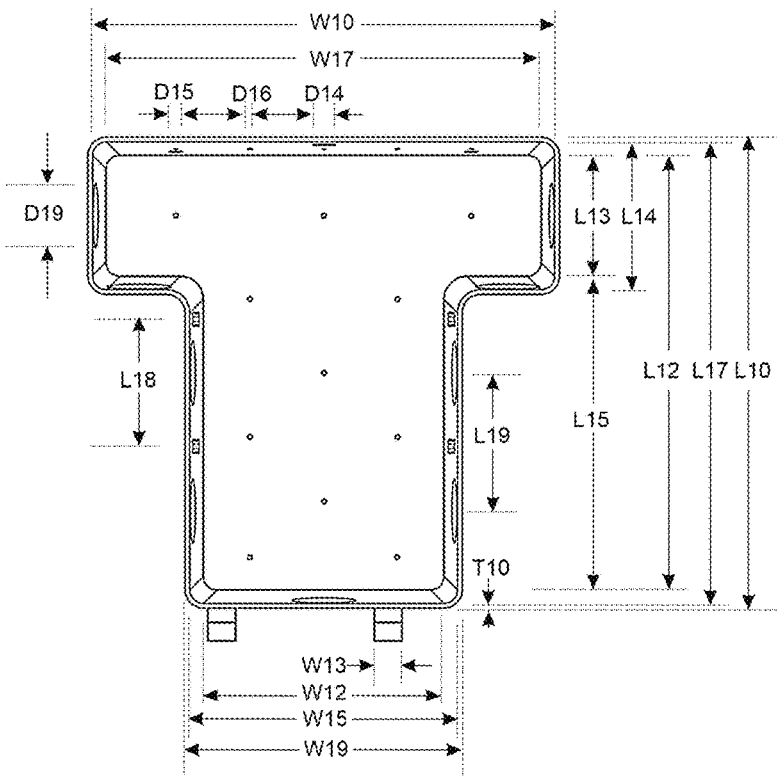
FIG. 25A is a top view of the main body showing dimensions according to the present invention.
Figure 25B:
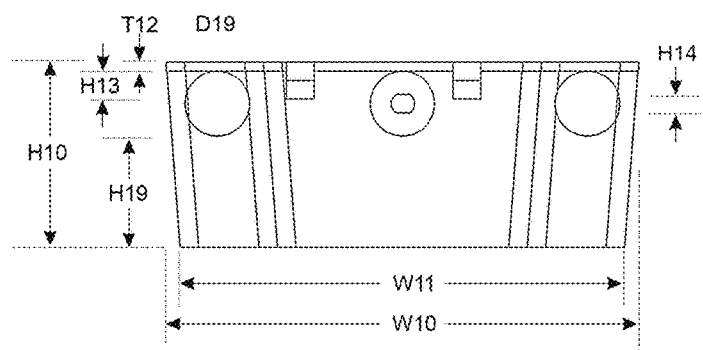
FIG. 25B is a front view of the main body showing dimensions according to the present invention.

A dimensioned top view of the main body 10 is shown in FIG. 25A, a dimensioned side view of the main body 10 is shown in FIG. 25C, and a dimensioned front view of the main body 10 is shown in FIG. 25B. The overall width W10, the interior width of the top part W17 and exterior width of the lower part W19 provide the measurements of the top and bottom sections. The overall length L10, interior length of the top part L14, and inner length L17 determine the internal compartment lengths. The distance L18 between rod holders 18 and length L19 between entry centers provide internal spacing for components. The diameters include the knuckle hole diameters D13, cam lock hole diameter D14, security cable hole diameter D15, screw hole diameters D16, and rodent entry hole diameters D19. In the front view, the bottom width W11, the knuckles width W13, and interior width W15 of the lower section provide the lower section measurements. The overall height H10 from entry center to top, and height from bottom of entry to floor H19 define the vertical structure. In the side view, the exterior bottom length L11, height from the bottom of the entry to the floor H19, and wall thickness T12 complete the structural dimensions of the main body.

The overall width W10 is about 12.75", preferably 12.75"; the width of the bottom W11 is about 12", preferably 12"; the interior width of the top part W17 is about 12.5", preferably 12.5"; and the exterior width W19 of the lower part is about 7.5", preferably 7.5". The width W13 of the knuckles is about ¾", preferably ¾", and the interior width W15 of the lower section is about 7.25", preferably 7.25". The overall length L10 is about 12.75", preferably 12.75"; the exterior bottom length L11 is about 12", preferably 12"; the interior length L14 of the top part is about 3.875", preferably 3.875"; the length L15 of the lower part is about 8.5", preferably 8.5"; and the inner length L17 is about 12.5", preferably 12.5". The distance L18 between rod 18 holders is about 3.44", preferably 3.44", and the length L19 between entry centers is about 3.75", preferably 3.75". The diameter D13 of the knuckle holes is about ⅜", preferably ⅜"; the diameter D14 of the cam lock hole is about ⅝", preferably ⅝"; the diameter D15 of the security cable hole is about ⅜", preferably ⅜"; the diameter D16 of the screw holes is about ⅛", preferably ⅛"; and the diameter D19 of the rodent entry holes is about 1.75", preferably 1.75". The overall height H10 is about 5", preferably 5"; the height H13 from the center of the entry to the top is about ¾", preferably ¾"; the height H19 from the bottom of the entry to the floor is about 3", preferably 3"; and the height H14 of the knuckles is about ½", preferably ½". The thickness T12 of the walls is about ¼", preferably ¼", and the thickness T10 of the floor is about 0.125", preferably 0.125".

Figure 26C:
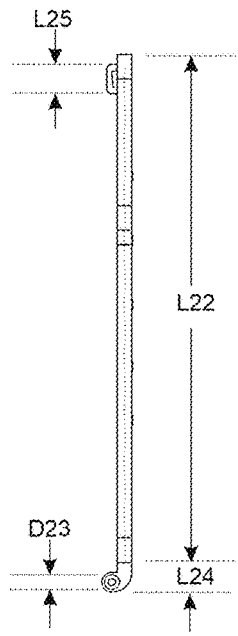
FIG. 26C is a side view the top cover showing dimensions according to the present invention.
Figure 26A:
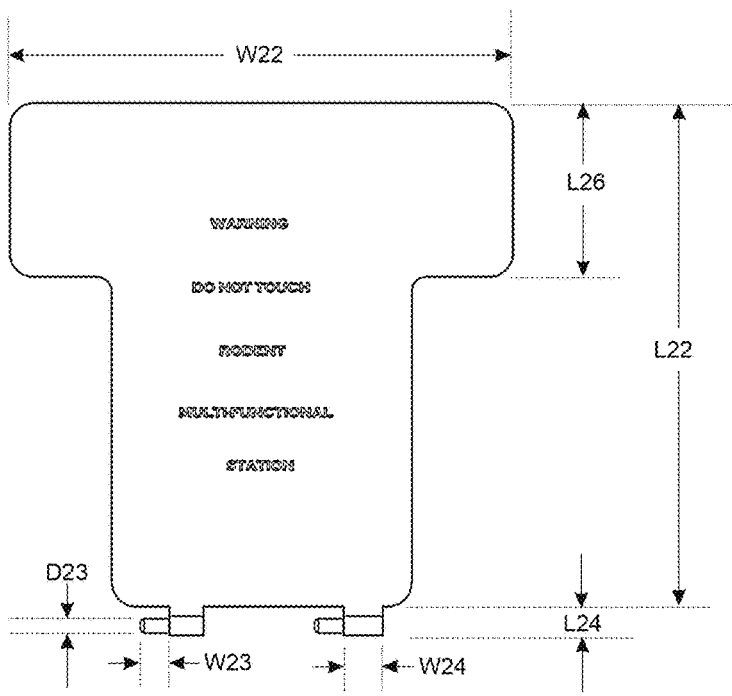
FIG. 26A is a top view of the top cover showing dimensions according to the present invention.
Figure 26B:
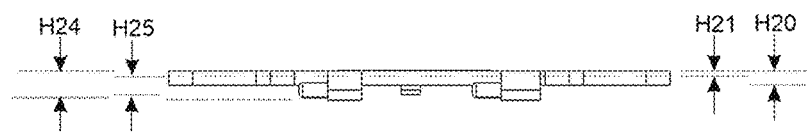
FIG. 26B is a front view of the top cover showing dimensions according to the present invention.
Figure 26D:
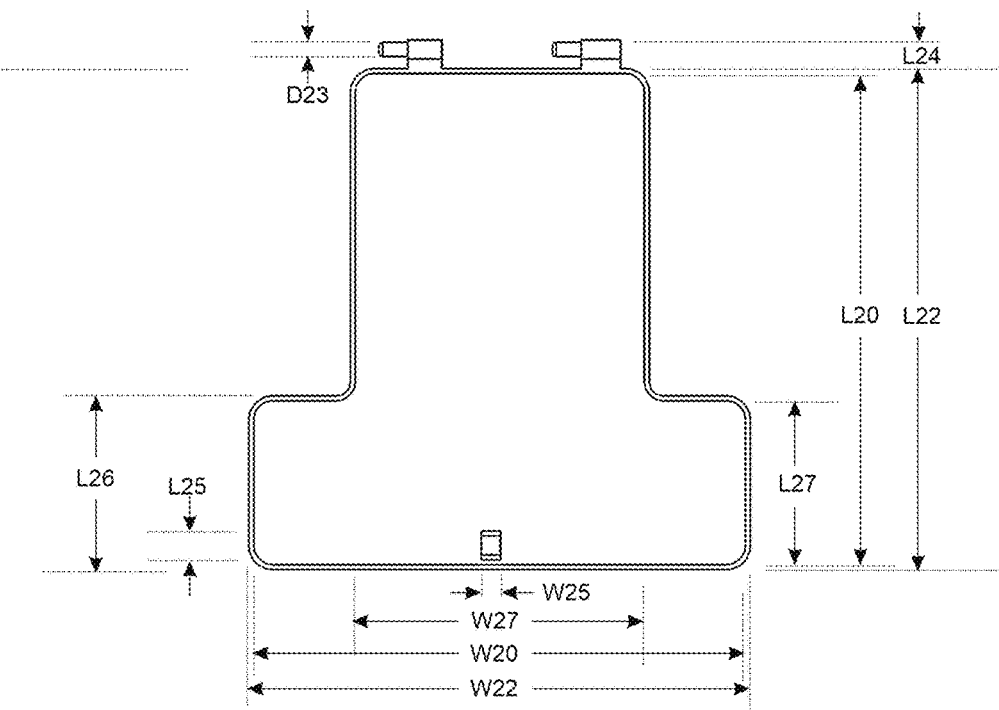
FIG. 26D is a bottom view of the top cover showing dimensions according to the present invention.

A dimensioned top view of the top cover 20 is shown in FIG. 26A, a dimensioned side view of the top cover 20 is shown in FIG. 26C, and a dimensioned end view of the top cover 20 is shown in FIG. 26B, and a dimensioned bottom view of the top cover 20 is shown in FIG. 26D. The overall width W22 of the lid is shown as the full span across the top part, while the interior width W20 of the top part and the width W27 of the lower part illustrate the width of specific sections. The width W23 of the pins, the width W24 of the pin bases, and the width W25 of the locking slot are provided to define the connection and locking mechanisms at the bottom of the lid. The overall length L22 of the lid, along with the length L26 of the upper part of the lid and the interior length L27 of the upper part, are indicated to show the full horizontal and internal dimensions of the lid. The length L24 of the pin bases and the length L25 of the locking slot provide the vertical dimensions necessary for attachment. The overall H20 height D23 of the lid and the diameter of the pins are also noted, giving the complete measurements required for securing the lid to the main body of the station.

The overall width of the lid W22 is about 13", preferably 13", and the interior width of the top part W20 is about 12.75", preferably 12.75". The width of the lower part of the lid W27 is about 7¼", preferably 7¼", while the width of the pins W23 is about ¾", preferably ¾", and the width of the pin bases W24 is about ⅞", preferably ⅞". The width of the locking slot W25 is about ⅜", preferably ⅜". The overall length of the lid L22 is about 13", preferably 13", and the interior length of the lid L20 is about 12.75", preferably 12.75". The length of the upper part of the lid L26 is about 4.5", preferably 4.5", and the interior length of the upper part L27 is about 4.25", preferably 4.25". The length of the pin bases L24 is about ⅝", preferably ⅝", and the length of the locking slot L25 is about 1", preferably 1". The overall height of the lid H20 is about ⅜", preferably ⅜", while the height of the pin bases H21 is about ⅛", preferably ⅛". The height of the pin base H24 is about ¾", preferably ¾", and the height of the knuckle area H25 is about ½", preferably ½". Lastly, the diameter of the pins D23 is about ⅜", preferably ⅜".

Figure 27C:
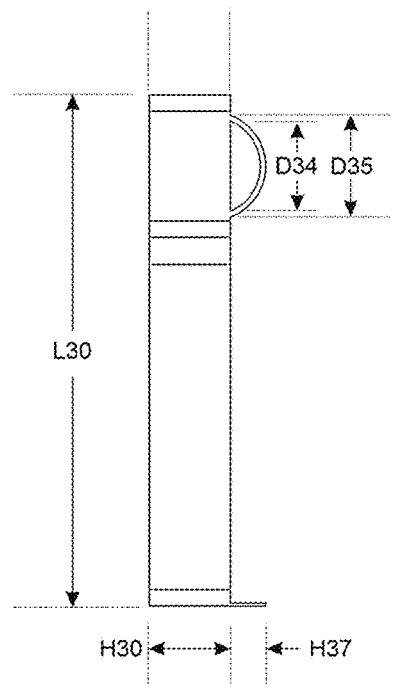
FIG. 27C is a side view the main body liner showing dimensions according to the present invention.
Figure 27A:
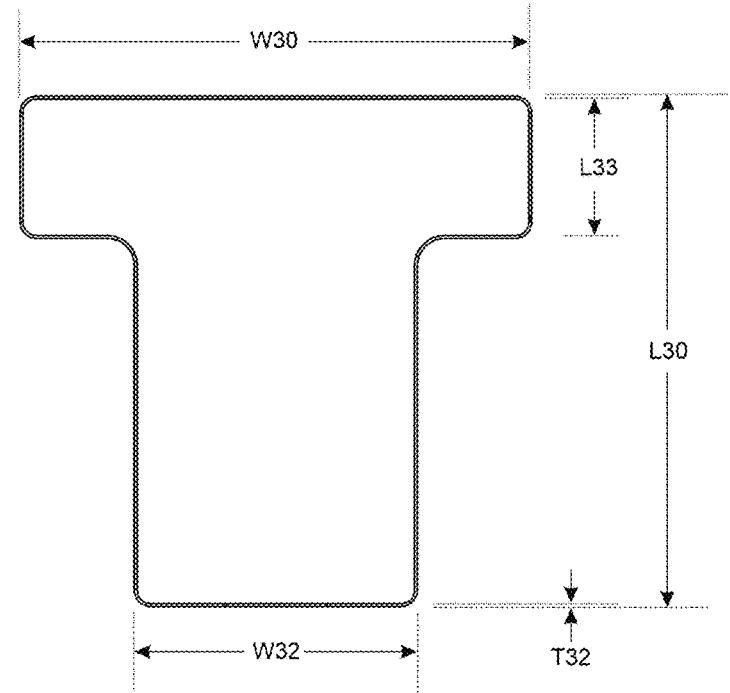
FIG. 27A is a top view of the main body liner showing dimensions according to the present invention.
Figure 27B:
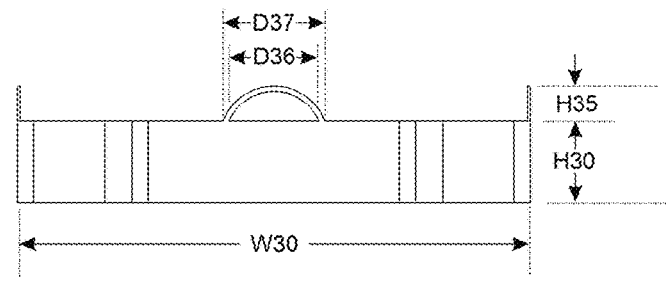
FIG. 27B is a front view of the main body liner showing dimensions according to the present invention.

A dimensioned top view of the main body liner 30 is shown in FIG. 27A, a dimensioned side view of the main body liner 30 is shown in FIG. 27C, and a dimensioned end view of the main body liner 30 is shown in FIG. 27B. The overall width of the main body liner W30 is shown as the full horizontal span, while the width of the lower part of the main body liner W32 details the narrower section at the bottom. The overall length of the main body liner L30 represents the full vertical length, while the length of the top part L33 specifies the horizontal span of the upper portion. The height of the main body liner H30 shows the vertical dimension from the base to the top of the liner, with the height of the side handles H35 and height of the front handle H37 illustrating the relative positioning of the handles for easy grip and movement. The diameter of the interior arch of the side handle D34 and the diameter of the exterior arch of the side handle D35 define the curvature and size of the side handles, ensuring ergonomic handling. Similarly, the diameter of the interior arch of the front handle D36 and the diameter of the exterior arch of the front handle D37 provide the measurements for the front handle's grip. The thickness of the rim T32 ensures structural strength and durability of the liner.

The overall width of the main body liner W30 is about 11.75", preferably 11.75", and the width of the lower part of the main body liner W32 is about 3.25", preferably 3.25". The overall length of the main body liner L30 is about 11.75", preferably 11.75", while the length of the top part L33 is about 3⅛", preferably 3⅛". The height of the main body liner H30 is about 1⅞", preferably 1⅞", with the height of the side handles H35 and height of the front handle H37 both being about ¾", preferably ¾". The diameter of the interior arch of the side handle D34 is about 2.25", preferably 2.25", and the diameter of the exterior arch of the side handle D35 is about 2.5", preferably 2.5". Similarly, the diameter of the interior arch of the front handle D36 is about 2.25", preferably 2.25", and the diameter of the exterior arch of the front handle D37 is about 2.5", preferably 2.5". The thickness of the rim T32 is about 1/16", preferably 1/16".

A dimensioned top view of the pellet container 40 is shown in FIG. 28A, a dimensioned side view of the pellet container 40 is shown in FIG. 28C, and a dimensioned end view of the pellet container 40 is shown in FIG. 28B. The overall width of the pallet container W40 is indicated as the total horizontal span, while the width of the top and lower part W42 shows the horizontal dimensions of both sections. The width of the liquid outlets W45 defines the opening for the liquid to flow out. The overall length of the pallet container L40 represents the full vertical distance from top to bottom, with the length of the middle part L42 showing the horizontal span of the central section, and the length of the liquid outlets L45 defining their extension. The diameter of the liquid reservoir holder D44 and the diameter of the liquid outlets D45 ensure the correct size for holding and dispensing liquid poison or other substances. The overall height of the pallet container H40 gives the vertical dimension, while the height of the liquid outlet H46 defines the vertical distance of the outlet from the base. Lastly, the thickness of the top edge T40 indicates the strength and durability of the pallet container's structure.

The overall width of the pallet container W40 is about 6", preferably 6", while the width of the top and lower part W42 is about 2.25", preferably 2.25". The width of the liquid outlets W45 is about ½", preferably ½". The overall length of the pallet container L40 is about 11.5", preferably 11.5", with the length of the middle part L42 being about 5.25", preferably 5.25", and the length of the liquid outlets L45 is about ½", preferably ½". The diameter of the liquid reservoir holder D44 is about 1.75", preferably 1.75", and the diameter of the liquid outlets D45 is about 1.5", preferably 1.5". The overall height of the pallet container H40 is about 0.5", preferably 0.5", and the height of the liquid outlet H46 is about 1.44", preferably 1.44". Lastly, the thickness of the top edge T40 is about 0.125", preferably 0.125".

The overall length L50 is about 8.375", preferably 8.375", providing the total vertical span of the reservoir. The overall height H50 is about 2.75", preferably 2.75", showing the vertical dimension of the main body, while the height of the liquid outlet H52 is about 1.43", preferably 1.43", specifying the distance of the outlet from the base of the reservoir. The diameter of the larger liquid outlet D52 is about 1.5", preferably 1.5", and the diameter of the smaller liquid outlet D53 is about 1.25", preferably 1.25", ensuring precise measurements for the dispensing mechanism. The thickness of the liquid outlet walls T52 is about 0.125", preferably 0.125", providing structural integrity to the outlet.

While the invention herein disclosed has been described by means of specific embodiments and applications thereof, numerous modifications and variations could be made thereto by those skilled in the art without departing from the scope of the invention set forth in the claims.

I claim:

1. A rodent multifunctional station comprising:
   a main body having a plurality of rodent entry points;
   an internal portion of the main body;
   a top cover removably attached to the main body closing the interior portion;
   a removable and replaceable liner residing in the internal portion of the main body;
   a rodent killing element carried by the liner and comprising at least one of:
   a plurality of rodent traps residing in the liner; or
   a poison element comprising: pellet bait; or a liquid poison dispenser containing poison and configured to engage a container; and
   wherein the plurality of rodent entry points are positioned at least 3 inches from a floor of the main body to inhibit ingress by crawling insects while permitting ingress by rodents.

2. The rodent multifunctional station of claim 1, having a tubular cam lock mechanism securing the top cover to the main body.

3. The rodent multifunctional station of claim 1, further having metal rods positioned within the main body for suspending bait blocks.

4. The rodent multifunctional station of claim 1, wherein the liner includes side and front handles ergonomically designed for easy removal and reinsertion into the main body.

5. The rodent multifunctional station of claim 1, wherein the container includes a central liquid reservoir holder with surrounding liquid outlets for dispensing liquid poison.

6. The rodent multifunctional station of claim 1, wherein the main body further comprises drainage points to prevent the buildup of liquids.

7. The rodent multifunctional station of claim 1, wherein the plurality of entry points having a height from the center of the plurality of entry point to a top of the main body is ¾ inches.

8. A rodent multifunctional station comprising:
   a main body with multiple rodent entry points and an internal structure designed to hold one or more rodent traps or bait;
   a top cover hingedly attached to the main body;
   a locking mechanism securing the top cover to the main body;
   a container within the main body having a central liquid reservoir holder with surrounding liquid outlets for dispensing liquid poison;
   a set of metal rods suspended within the main body for holding rodent baits; and
   wherein the multiple rodent entry points are positioned at least 3 inches from a floor of the main body to inhibit ingress by crawling insects while permitting ingress by rodents.

9. The rodent multifunctional station of claim 8, further comprising a secondary liquid poison reservoir removeably positioned inside the main body, the secondary liquid poison reservoir having one or more outlets for dispensing liquid poison.

10. The rodent multifunctional station of claim 8, wherein the rodent entry points are spaced apart at a height that prevents insects from entering the station.

11. The rodent multifunctional station of claim 8, further comprising security cable holes on the main body for securing the station to a fixed object.

12. The rodent multifunctional station of claim 8, wherein the multiple rodent entry points having a height from the center of the multiple rodent entry points to a top of the main body is ¾ inches.

13. A rodent multifunctional station comprising:
   a main body with multiple rodent entry points and having a two-tier structure with an inner top floor and a bottom floor, configured to hold rodent traps or bait;
   a removable liner positioned inside the main body, designed to collect and contain rodent droppings, poison, and dirt;
   a top cover attached to the main body engaged by pins and knuckles, the cover including a locking mechanism to prevent unauthorized access;
   a liquid or pellet container placed inside the main body, designed to hold and dispense liquid poison or pellet bait;
   at least one tubular cam lock for securing the top cover to the main body;
   a drainage system integrated into the main body to prevent liquid buildup; and
   wherein the multiple rodent entry points are positioned at least 3 inches from a floor of the main body to inhibit ingress by crawling insects while permitting ingress by rodents.

14. The rodent multifunctional station of claim 13, wherein the liner is configured with handles that allow for easy removal and cleaning.

15. The rodent multifunctional station of claim 13, wherein the top cover includes a locking slot that interacts with the tubular cam lock for enhanced security.

16. The rodent multifunctional station of claim 13, wherein the liquid or pellet container includes liquid poison outlets positioned for optimal poison distribution.

17. The rodent multifunctional station of claim 13, wherein the metal rods within the main body are positioned to securely hold rodent bait blocks.

18. The rodent multifunctional station of claim 13, further having screw holes on the main body for fastening the station to a surface.

19. The rodent multifunctional station of claim 13, wherein the top cover includes a printed or engraved warning label to prevent tampering.

20. The rodent multifunctional station of claim 13, wherein the multiple rodent entry points having a height from the center of the multiple rodent entry points to a top of the main body is ¾ inches.

21. A multi-functional rodent station comprising:
   a housing including a main body and a top cover that enclose an interior cavity;
   a removable body liner positioned within the main body and configured to collect droppings, dirt, or debris, the liner being treated with salt or other deterrent material to repel insects;
   a plurality of interchangeable trap or bait modules removably receivable in the cavity,
   the modules selected from glue traps, snap traps, reusable traps, and pellet containers; a liquid-poison dispenser comprising: a transparent reservoir marked with graduated volume indicia, and a dispensing outlet; and
   wherein the housing defines a plurality of rodent entry openings elevated at least three inches above a lower surface of the housing to inhibit entry of insects or crawling pests.

22. The station of claim 21, wherein the housing is molded of impact-resistant HDPE plastic sufficient to resist damage from pets or children.

23. The station of claim 21, wherein the liner and modules are individually removable for cleaning or replacement without disassembling the housing.

24. The station of claim 21, further comprising safety indicia or warnings molded or printed on the cover.

25. The station of claim 21, wherein the liner, dispenser, and trap modules are stackably stored within the cavity to provide multiple pest control configurations when the station is in use.

* * * * *